(12) United States Patent
Gandhi

(10) Patent No.: US 10,839,056 B2
(45) Date of Patent: *Nov. 17, 2020

(54) SYSTEM AND METHOD FOR UNLOCKING DEVICES ASSOCIATED WITH A CARRYING BAG

(71) Applicant: eBay Inc., San Jose, CA (US)

(72) Inventor: Saumil Ashvin Gandhi, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/911,942

(22) Filed: Mar. 5, 2018

(65) Prior Publication Data

US 2018/0196933 A1    Jul. 12, 2018

Related U.S. Application Data

(63) Continuation of application No. 14/581,539, filed on Dec. 23, 2014, now Pat. No. 9,953,148.

(51) Int. Cl.
| | | |
|---|---|---|
| *G11C 7/00* | (2006.01) | |
| *G06F 13/00* | (2006.01) | |
| *G06F 12/14* | (2006.01) | |
| *G06F 12/00* | (2006.01) | |
| *G06F 7/04* | (2006.01) | |
| *G06F 21/32* | (2013.01) | |

(52) U.S. Cl.
CPC .................................. *G06F 21/32* (2013.01)

(58) Field of Classification Search
CPC ....................................................... G06F 21/32

USPC .......................................................... 726/19
See application file for complete search history.

(56) References Cited

U.S. PATENT DOCUMENTS

| | | | |
|---|---|---|---|
| 9,172,699 B1* | 10/2015 | Vazquez | H04L 63/0861 |
| 9,953,148 B2 | 4/2018 | Gandhi | |
| 2004/0263318 A1* | 12/2004 | Dvorak | H04W 4/80 340/5.53 |
| 2007/0057763 A1* | 3/2007 | Blattner | G06F 3/03543 340/5.52 |
| 2009/0158423 A1* | 6/2009 | Orlassino | G06F 21/32 726/19 |
| 2009/0226050 A1* | 9/2009 | Hughes | A45C 13/18 382/124 |
| 2010/0205658 A1* | 8/2010 | Griffin | G06F 21/32 726/5 |

(Continued)

OTHER PUBLICATIONS

Sampo Ojala; Wearable Authentication Device for Transparent Login in Nomadic Applications Environment; 2008 IEEE; p. 1-6.*

(Continued)

*Primary Examiner* — Monjur Rahim
(74) *Attorney, Agent, or Firm* — SBMC

(57) ABSTRACT

A system and method for unlocking devices associated with a carrying bag are provided. In example embodiments, biometric information of a user from a biometric reader is received by an authentication system. The biometric reader is located on a pull mechanism of a sliding fastening device for a carrying bag. The user is authenticated by verifying the validity of the biometric information. The authenticated user is associated with the carrying bag. Based on a set of pre-defined permissions, one or more devices associated with the carrying bag are unlocked.

20 Claims, 16 Drawing Sheets

(56) References Cited

U.S. PATENT DOCUMENTS

| | | | | |
|---|---|---|---|---|
| 2011/0074543 | A1* | 3/2011 | Kaczmarz | G07C 9/00571 340/5.73 |
| 2011/0186397 | A1* | 8/2011 | Sheikh | A45C 13/00 190/120 |
| 2013/0173477 | A1* | 7/2013 | Cairns | G06Q 20/3226 705/76 |
| 2013/0191909 | A1* | 7/2013 | Akil | G05B 19/0428 726/19 |
| 2014/0085048 | A1* | 3/2014 | Hadizad | G06F 21/34 340/5.64 |
| 2014/0289833 | A1* | 9/2014 | Briceno | H04L 63/08 726/7 |
| 2014/0335789 | A1* | 11/2014 | Cohen | H04W 8/005 455/41.2 |
| 2014/0337930 | A1* | 11/2014 | Hoyos | H04L 63/10 726/4 |
| 2015/0074797 | A1* | 3/2015 | Choi | G06F 21/32 726/19 |
| 2015/0113636 | A1* | 4/2015 | Forbes | G06F 21/00 726/19 |
| 2015/0143511 | A1* | 5/2015 | Vujic | G06F 21/32 726/19 |
| 2015/0161836 | A1* | 6/2015 | Park | G07C 9/00134 340/5.51 |
| 2015/0186636 | A1* | 7/2015 | Tharappel | G06F 21/32 726/8 |
| 2015/0286813 | A1* | 10/2015 | Jakobsson | G06F 21/35 726/9 |
| 2015/0310251 | A1* | 10/2015 | Wyrwas | G06F 21/32 348/77 |
| 2016/0050204 | A1* | 2/2016 | Anderson | H04L 63/0853 726/4 |
| 2016/0050217 | A1* | 2/2016 | Mare | H04L 9/3215 726/4 |
| 2016/0180069 | A1 | 6/2016 | Gandhi | |

OTHER PUBLICATIONS

Final Office Action received for U.S. Appl. No. 14/581,539, dated Oct. 24, 2016, 11 pages.
Non-Final Office Action received for U.S. Appl. No. 14/581,539, dated Feb. 16, 2016, 12 pages.
Non-Final Office Action received for U.S. Appl. No. 14/581,539, dated Jun. 29, 2017, 13 pages.
Notice of Allowance received for U.S. Appl. No. 14/581,539, dated Dec. 15, 2017, 14 pages.
Response to Final Office Action filed on Jan. 20, 2017, for U.S. Appl. No. 14/581,539, dated Oct. 24, 2016, 12 pages.
Response to Non-Final Office Action filed on Jul. 18, 2016, for U.S. Appl. No. 14/581,539, dated Feb. 16, 2016, 13 pages.
Response to Non-Final Office Action filed on Sep. 26, 2017, for U.S. Appl. No. 14/581,539, dated Jun. 29, 2017, 11 pages.
Sanchez et al., "SmartSantander: Experimentation and Service Provision in the Smart City", 2013, pp. 1-6.

* cited by examiner

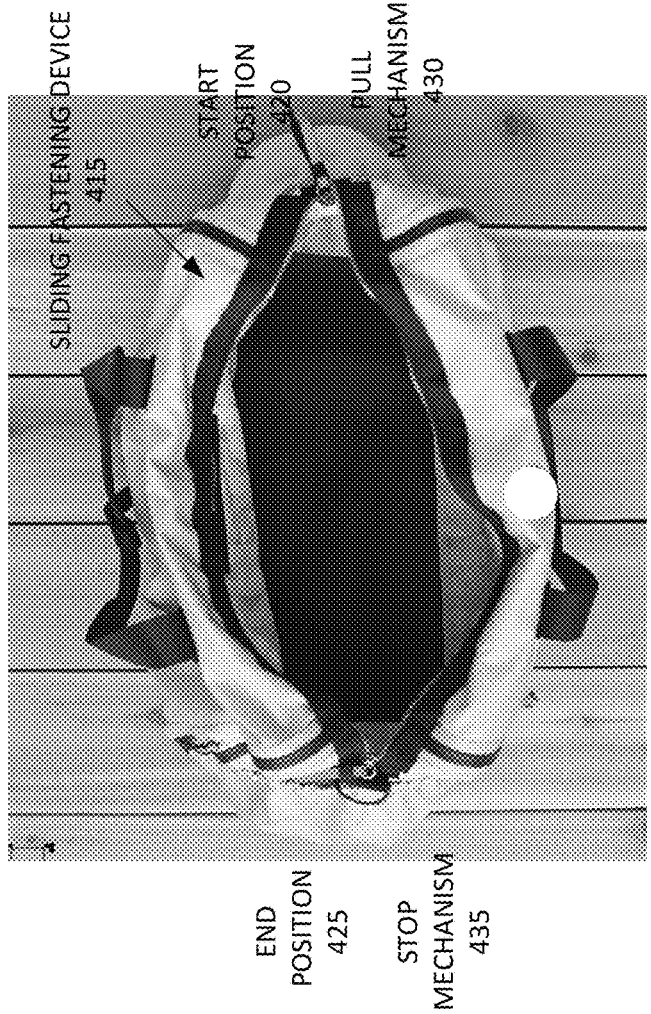
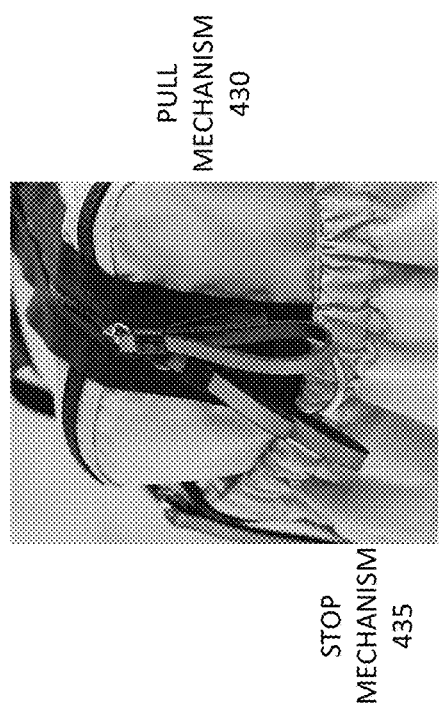
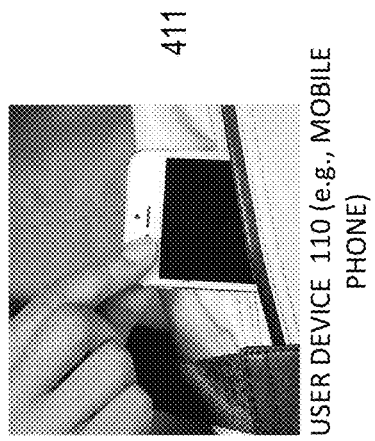
FIG. 4A
FIG. 4B
FIG. 4C

CARRYING BAG 500
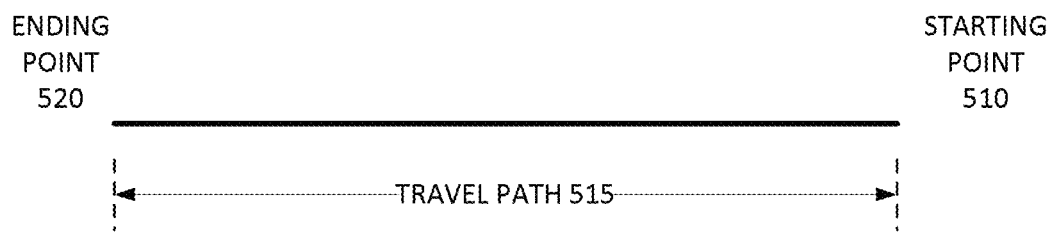
FIG. 5A
END POSITION OF PULL MECHANISM AT ENDING POINT 520
STARTING POINT WITH PULL MECHANISM 501 AT END POSITION
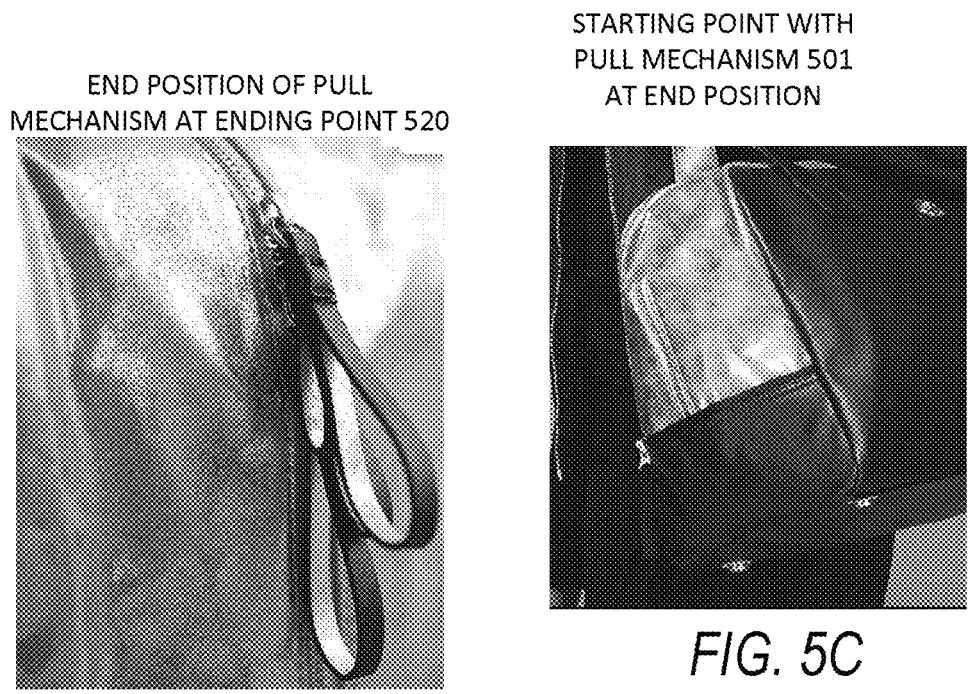
FIG. 5B
FIG. 5C

AUTHENTICATION TABLE 710

712

| USER/IDENTIFICATION INFO | 1. USER NAME | 2. PASSWORD | 3. FINGERPRINT | 4. PATTERN | COMBINATION INFO |
|---|---|---|---|---|---|
| USER 1 | John Jacob | XYZR | 100100010100 | § | NONE |
| USER 2 | Ann Morris | abcT12 | 101010000101 | √ | 3 AND 4 |
|  |  |  |  |  |  |
|  |  |  |  |  |  |
| USER N | Robert Johnston | RTXz! | 111100001010 | Ω | 2 AND 3 |

AUTHORIZATION TABLE 720

| DEVICE | UNLOCK DEVICE | UNLOCK APP 1 | UNLOCK APP 2 | UNLOCK APP 3 |
|---|---|---|---|---|
| DEVICE 1 | X | X | X | X |
| DEVICE 2 | X |  | X |  |
|  |  |  |  |  |
|  |  |  |  |  |
|  |  |  |  |  |
| DEVICE N | X |  |  |  |

*FIG. 7B*

BAG SECURITY LEVEL TABLE 730

|  | SECURITY LEVEL |
|---|---|
| BAG 1 | LEVEL 3 |
| BAG 2 | LEVEL 2 |

*FIG. 7C*

PAIRING TABLE 740 OF BAGS AND DEVICES

|  | BAG 1 | BAG 2 | BAG 3 |
|---|---|---|---|
| DEVICE 1 | X | X | X |
| DEVICE 2 | X |  | X |
| DEVICE 3 | X |  | X |

*FIG. 7D*

SECURITY LEVEL TABLE 920

| SECURITY LEVEL INFORMATION | | | | |
|---|---|---|---|---|
| | USER NAME | PASSWORD | FINGERPRINT | PATTERN |
| LEVEL 1 | | X | X | |
| LEVEL 2 | | | X | X |
| LEVEL 3 | | | X | |

SYSTEM AND METHOD FOR UNLOCKING DEVICES ASSOCIATED WITH A CARRYING BAG

PRIORITY

This application is a continuation of and claims the benefit of priority to U.S. patent application Ser. No. 14/581,539, entitled "SYSTEM AND METHOD FOR UNLOCKING DEVICES ASSOCIATED WITH A CARRYING BAG," filed on Dec. 23, 2014, which is hereby incorporated by reference herein in its entirety.

TECHNICAL FIELD

Embodiments of the present disclosure relate generally to unlocking electronic devices and, more particularly, but not by way of limitation, to unlocking devices associated with carrying bag.

BACKGROUND

Biometric authentication methods, used alone or in combination with other authentication methods, may provide high assurances of authentication (as compared with simple passwords) without changing a user's behavior. Typical biometrics used to authenticate users may include fingerprints, facial features, speech patterns, iris patterns, and so forth.

BRIEF DESCRIPTION OF THE DRAWINGS

Various ones of the appended drawings merely illustrate example embodiments of the present disclosure and cannot be considered as limiting its scope.

FIGS. 4A-C illustrate an example of a carrying bag with a sliding fastening device having a start position and an end position, according to one embodiment.

FIGS. 5A-C illustrate an example of a carrying bag with a travel path for a sliding fastening device, according to another embodiment.

FIGS. 7A-7D illustrate various tables used by the authentication system to authenticate and authorize the unlocking of user devices, according to example embodiments.

Figure 1:
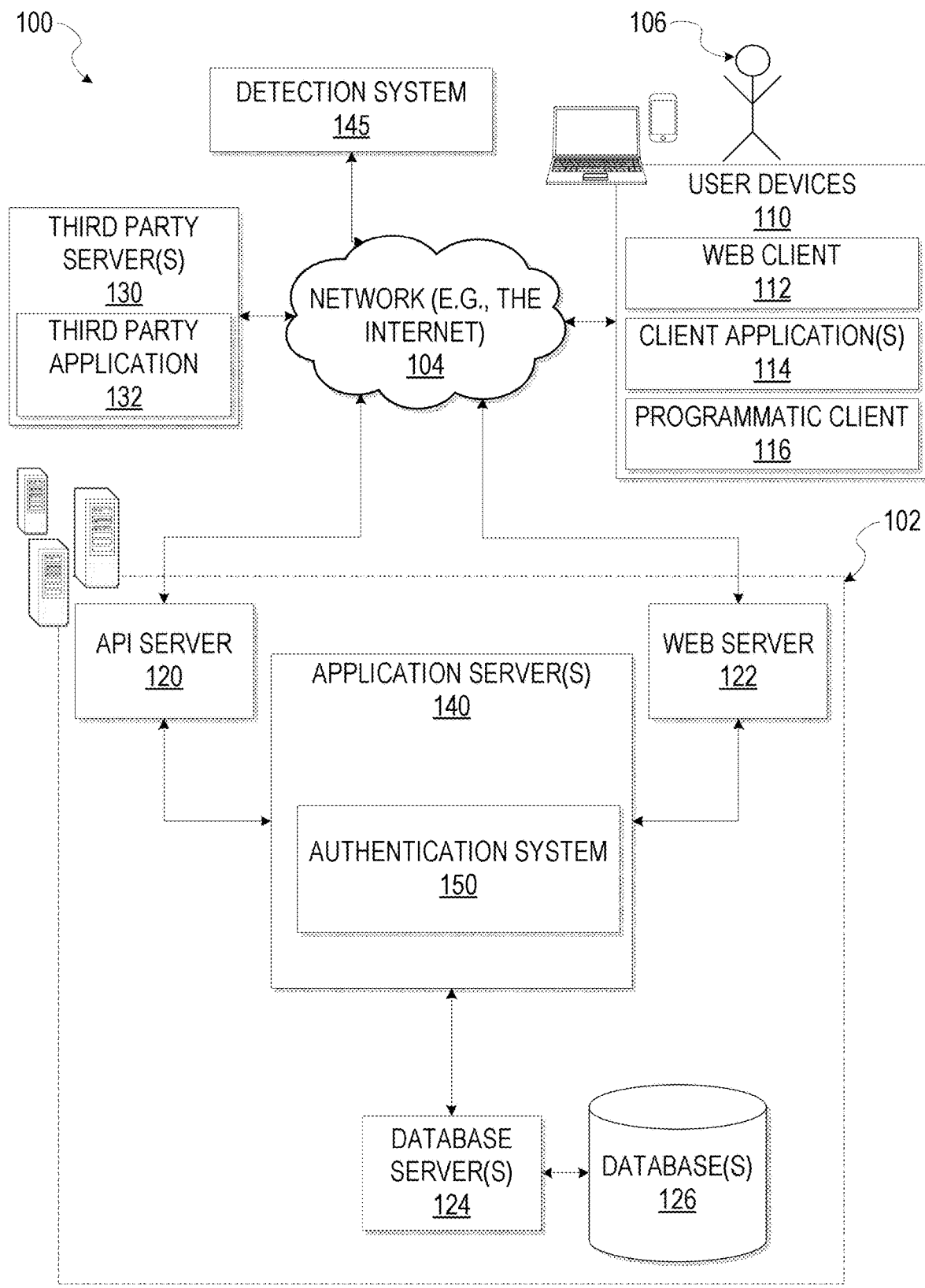
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In various example embodiments, one or more user devices within a carrying bag are unlocked when a user unzips the carrying bag. The carrying bag includes a sliding fastening device (e.g., a zipper or other opening and closing device) with a pull mechanism that includes a biometric reader. The carrying bag may represent any type of bag or case that can be opened or closed with a sliding fastening device. In some embodiments, the carrying bag may represent clothing such as a coat with zippered pockets. In various embodiments, the function provided by the sliding fastening devices is to open and close a carrying bag with a zipper or zipper like device, and to detect user identification information with a sensor or receiver. In some embodiments, during the process of opening a carrying bag, one or more registered user devices stored within the carry bag are unlocked. In some embodiments, the registered user devices may be located outside the carrying bag. In further embodiments, the grasping of the pull mechanism may be used to unlock the sliding fastening device, regardless of whether the pull mechanism is used to open the carrying bag.

In example embodiments, the sliding fastening devices include a biometric reader or sensor. The biometric reader may be integrated with the pull mechanism or attached to the pull mechanism in a manner that does not affect the pull or detection functions of the pull mechanism. In various embodiments, the biometric reader may be single sided (to read one fingerprint) or double sided (to read two fingerprints) while in contact with the user.

When the user is in contact with the biometric reader of the pull mechanism for more than a predetermined period of time, the biometric reader sends user identification information representing detected biometric information of a user to an authentication system. In various embodiments, the user may grasp the pull mechanism and manipulate it in order to open the sliding fastening device.

In some embodiments, the biometric information of a user may be provided by a user device (paired with a carrying bag) located outside the carrying bag. For example, a smart phone that includes a biometric reader may be used to send user identification information (such as detected biometric information) to an authentication system. In other embodiments, the user identification information from the user device may be sent to the pull mechanism or the sliding fastening device to unlock the sliding fastening device. Once the sliding fastening device is unlocked or opened, one or more user devices associated with the carrying bag may be unlocked in other embodiments.

The authentication system may perform authentication of users (and carrying bags) and authorization to unlock registered devices paired with the carrying bags. The authentication may be performed remotely by a server or locally on one of the user devices. In various embodiments, the server may be in a cloud computing environment.

In example embodiments, the predetermined period of time for user contact to initiate the detection process is long enough to determine that the user intends to open the carrying bag by opening the sliding fastening device. In situations where a user merely brushes against (or inadvertently touches) the pull device, any detected biometric information is not sent to the authentication system. In other words, the detection process (for authenticating users and authorizing registered user devices) is not triggered by very brief periods of user contact with the pull mechanism.

The authentication system is responsible for performing the authentication process and the authorization process in various embodiments. The authentication process verifies the validity of the user from the detected biometric information (e.g., single or double fingerprints). In some embodiments, the biometric information is used in combination with other user identification information (e.g., pattern recognition information or password pins) to verify the validity of the user.

Once the user is authenticated, the carrying bag may be implicitly authenticated in various embodiments based on the association of the user with the carrying bag. The pull mechanism (with the biometric reader) of the carrying bag provides user identification information that may be used to associate carrying bags and users in authentication tables. One or more authentication tables may store the fingerprint information (and other identification information) associated with users to verify the validity of the identity information provided by the detected biometric information or other identification information.

The authorization process includes (1) the preliminary authorization and (2) the actual authorization to unlock registered user devices. The preliminary authorization includes the registration (in an application) of one or more user devices and permissions associated with the registered user devices. During the registration process or after the registration process, additional user setting information may be provided to pair one or more user devices to one or more carrying bags (also referred to as pairing information). Additionally, the user setting information may include security information related to acceptable types of authentication or security levels associated with the registered devices. Other user setting information may include unlocking information specifying whether to unlock one or more apps installed on the user device when the user device is unlocked. In some embodiments, the user may specify whether to unlock multiple registered devices sequentially (and in a particular order) or whether to unlock concurrently. Collectively, the user setting information, pairing information, unlocking information, security information, and other user specified permissions are referred to as "pre-defined permissions." The pre-defined settings are stored in one or more authentication tables or authorization tables, which are accessible to the authentication system.

In some embodiments, the actual authorization process may be initiated after a user (and carrying bag) is authenticated. In other embodiments, the authentication and authorization processes may overlap. The authorization process accesses the pre-defined permissions associated with the user devices paired with the carrying bag, and determines whether to unlock those user devices based on the pre-defined permissions. In some embodiments, the authorized user devices are unlocked before the pull mechanism reaches its end position of the sliding fastening device.

With reference to FIG. 1, an example embodiment of a high-level client-server-based network architecture 100 is shown. A networked system 102 provides server-side functionality via a network 104 (e.g., the Internet or wide area network (WAN)) to a user device 110. In some implementations, a user (e.g., user 106) interacts with the networked system 102 using the user device 110. FIG. 1 illustrates, for example, a web client 112 (e.g., a browser, such as the Internet Explorer® browser developed by Microsoft® Corporation of Redmond, Wash. State), client application(s) 114, and a programmatic client 116 executing on the user device 110. The user device 110 may include the web client 112, the client application(s) 114, and the programmatic client 116 alone, together, or in any suitable combination. Although FIG. 1 shows one user device 110, in other implementations, the network architecture 100 comprises multiple user devices 110.

In various implementations, the user device 110 comprises a computing device that includes at least display and communication capabilities that provide access to the networked system 102 via the network 104. The user device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, Ultrabook, netbook, laptop, desktop, multi-processor system, microprocessor-based or programmable consumer electronic, game consoles, set-top box, network Personal Computer (PC), mini-computer, and so forth. In an example embodiment, the user device 110 comprises one or more of a touch screen, accelerometer, gyroscope, biometric sensor, camera, microphone, Global Positioning System (GPS) device, and the like.

The user device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMAX) network, another type of network, or any suitable combination thereof.

In some example embodiments, the user device 110 includes one or more of applications 114 (also referred to as "apps") such as, but not limited to, web browsers, book reader apps (operable to read e-books), media apps (operable to present various media types including audio and video), fitness apps, biometric monitoring apps, messaging apps, electronic mail (email) apps, authentication apps, and e-commerce site apps (also referred to as "marketplace apps"). In some implementations, the client application(s) 114 include various components operable to present information to the user and communicate with networked system 102. In some embodiments, if the authentication app is included in the user device 110, then this authentication app may be configured to locally provide the user interface and at least some of the functionalities with the authentication app configured to communicate with the networked system 102, on an as needed basis, for data or processing capabilities not locally available (e.g., access to a database of pre-defined permissions or login records, to authenticate a user). Conversely, if the authentication app is not included in the user device 110, the user device 110 can use its web browser to access an authentication system 150 (or a variant thereof) hosted on the networked system 102.

Also communicatively coupled to the network 104 is a detection system 145. The detection system 145 may receive or detect input used to generate user identification information that is provided to the authentication system 150 to authenticate and unlock registered user devices. In various embodiments, the detection system 145 is integrated with or attached to a carrying bag of the user 106. In example embodiments, the detection system 145 includes a biometric reader within a pull mechanism for a fastening sliding device of a carrying bag. In other embodiments, the detection system 145 may represent a pattern reader in a luggage tag or other attachment. In further embodiments, one or more user devices 110 may provide detection system functionality (for example, a mobile device may be used as detection system). The detection system 145 will be discussed in further detail below together with FIG. 2B.

In various example embodiments, the user (e.g., the user 106) comprises a person, a machine, or other means of interacting with the user device 110. In some example embodiments, the user 106 is not part of the network architecture 100, but interacts with the network architecture 100 via the user device 110, the detection system 145, or another means. In some embodiments, the detection system 145 may be implemented with the user device 110. For instance, the user 106 provides input (e.g., touch screen input, alphanumeric input, or biometric input) to the user device 110 or the detection system 145, and the input is communicated to the networked system 102 via the network 104. In this instance, the networked system 102, in response to receiving the input from the user 106, communicates information to the user device 110 via the network 104 to be presented to the user 106. In this way, the user can interact with the networked system 102 using the user device 110.

In various embodiments, the user 106 uses the user devices 110 during the preliminary authorization process to register one or more user devices 110 and to set permissions for the registered user devices 110 with an authentication system 150 hosted by application server(s) 140. In example embodiments, the detection system 145 includes a biometric reader (or other detector) that detects fingerprint information of the user 106 and sends the detected fingerprint information as user identification information to the authentication system 150 to authenticate the user 106.

An Application Program Interface (API) server 120 and a web server 122 may be coupled to, and provide programmatic and web interfaces respectively to, one or more application server(s) 140. The application server(s) 140 may host the authentication system 150, each of which may comprise one or more modules or applications and each of which may be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information accessed by the authentication system 150, such as the tables shown in FIG. 7A-7D.

Additionally, a third party application 132, executing on a third party server 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide authentication service functions (e.g., single sign-on) that are supported by the relevant applications of the networked system 102.

In various embodiments, the authentication system 150 provides functionality to authenticate and authorize users of a carrying bag for unlocking one or more registered user devices. The authentication system 150 will be discussed further in connection with FIGS. 2A-2C below.

Further, while the client-server-based network architecture 100 shown in FIG. 1 employs a client-server architecture, the present inventive subject matter is, of course, not limited to such an architecture, and may equally well find application in a distributed, or peer-to-peer, architecture system, or an n-tier system in cloud computing environment, for example.

The web client 112 may access the various systems of the networked system 102 via the web interface supported by the web server 122. Similarly, the programmatic client 116 and client application(s) 114 may access the various services and functions provided by the networked system 102 via the programmatic interface provided by the API server 120 to provide batch-mode communications between the programmatic client 116 and the networked system 102.

Figure 2A:
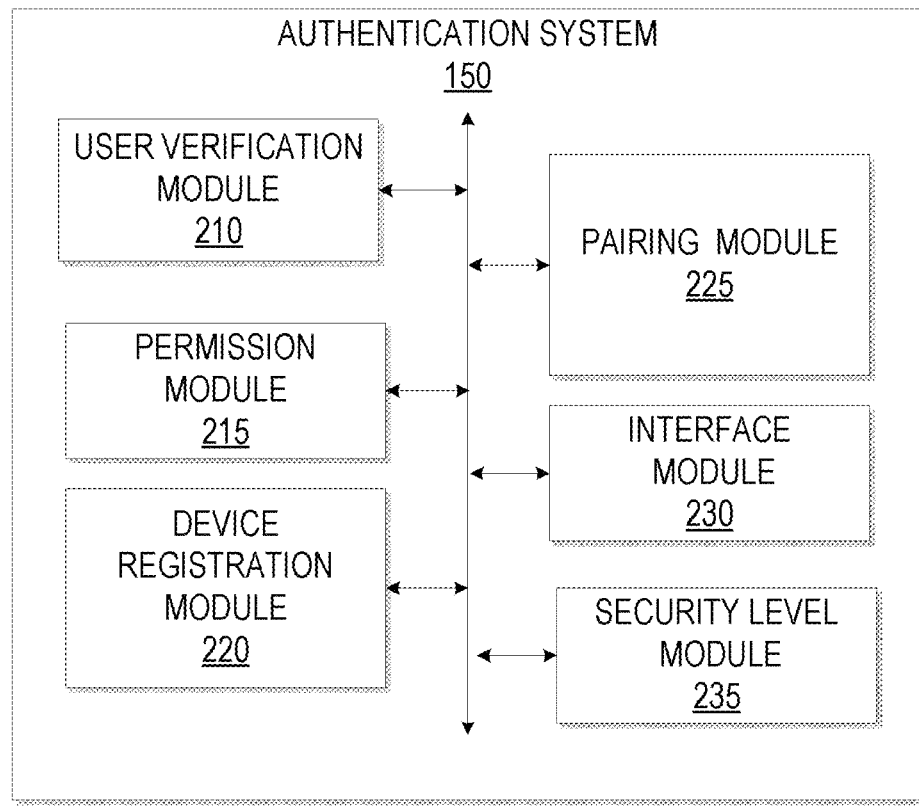
FIG. 2A is a block diagram illustrating an example embodiment of an authentication system, according to some example embodiments.

FIG. 2A is a block diagram of the authentication system 150, which may provide functionality to authenticate users (and carrying bags) and authorize the unlocking of registered devices. In an example embodiment, the authentication system 150 may include a user verification module 210, a permission module 215, a device registration module 220, a pairing module 225, an interface module 230, and a security level module 235.

Figure 2B:
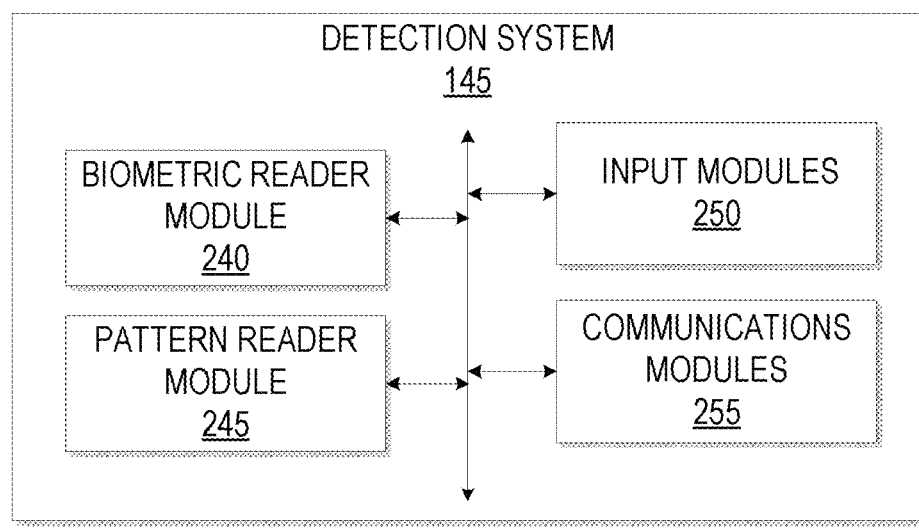
FIG. 2B is a block diagram illustrating an example embodiment of a detection system, according to some example embodiments.

FIG. 2B is a block diagram of a detection system 145, which may provide functionality to detect user information and send user identification information to the authentication system 150. In various embodiments, the detection system 145 is attached to or integrated with a carrying bag. The detection system 145 receives input from the user 106 to verify the validity of the user information in order to authenticate the user. In some embodiments, the user identification information represents detected biometric information. In other embodiments, other user information may be received (or inputted) by the detection system 145 and sent as user identification information to the authentication system 150. In some embodiments, the detection system 145 may perform some processing on the detected or received user information prior to sending the user identification information to the authentication system 150.

Figure 2C:
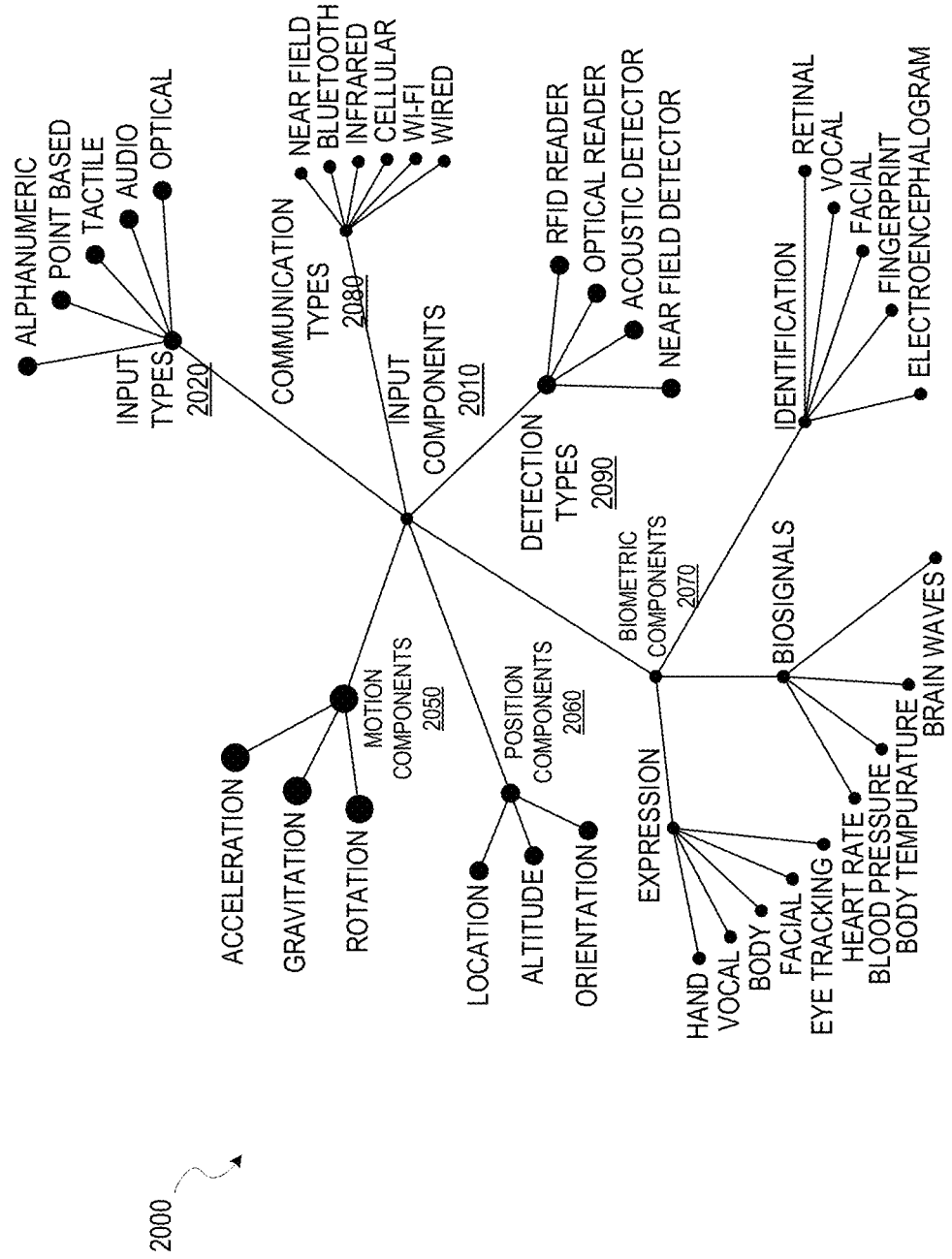
FIG. 2C is a diagram illustrating various examples of input components for providing user identification information to authenticate a user, according to some example embodiments.

FIG. 2C illustrates a variety of input components 2000 (including motion components 2050, position components 2060, biometric components 2070, detection types 2090, communication types 2080, and input types 2020) that may be received and used by the detection system 145. FIG. 2C will be discussed in further detail below. In an example embodiment, the detection system 145 may include a biometric reader that detects fingerprints of a user and provides biometric user identification information to the authentication system 150. In other embodiments, other input components 2010 may be used.

All, or some, of the modules 210-255 of FIGS. 2A and 2B may communicate with each other, for example, via a network coupling, shared memory, and the like. It will be appreciated that each module of modules 210-255 may be implemented as a single module, combined into other modules, or further subdivided into multiple modules. It will further be appreciated that the modules or functionality of the authentication system 150 may be implemented in the detection system 145 and the modules or functionality of the authentication system 150 may be implemented in the detection system 145. Other modules not pertinent to example embodiments may also be included, but are not shown.

Referring to FIG. 2A, the user verification module 210 may provide various user verification functionality operable to validate a user based on the user identification information provided by the detection system 145. The user identification information is used to prove the identity of a particular user 106. The authentication process is used to confirm (or validate) the identity of a user 106. In various embodiments, authentication involves verifying the validity of at least one form of identification. Entering a user name and password is a common way to authenticate a user. Receiving biometric information, such as fingerprint information, alone or in combination with other types of identification information, may be used to verify the validity of a user 106 in various embodiments.

In example embodiments, the user identification information (also referred to as "identification info") received by the authentication system 150 may be compared against existing login records for users 106, such as the authentication table 710 shown in FIG. 7A. The types of identification information are shown as column headers 711, and the users 106 are shown as row headers 712. One or more types of identification may be specified for a user 106, as specified in the combination info column 713.

In some embodiments, the authentication process performed by the user verification system may also include authenticating the carrying bags associated with a user 106. For example, the biometric reader has an identifier that associates a carrying bag with the user 106 who provided the fingerprint detected by the biometric reader.

Once the user verification module 210 authenticates a user 106, and in some embodiments, authenticates the associated carrying bag, the permission module 215 provides functionality to authorize registered devices to unlock based on a set of permission rules defined by the user 106. In various embodiments, the set of permission rules are referred to as a set of pre-defined permissions. The pre-defined permissions generally represent permissions and settings established by the user 106 during the preliminary authorization process, as described above.

FIG. 7B illustrates an example of an authorization table 720 that includes a number of devices (e.g., device 1 through device N), and which specifies authorization to unlock the devices and one or more applications (referred to as APP1-APP3) associated with each device. The set of pre-defined permissions shown in the table 720 represents unlocking information. In example embodiments, the unlocking of a device may also unlock one or more apps based on the pre-defined permissions for each device. In some embodiments, the pre-defined permissions may be stored in one or more storage devices 126, which are accessible by the permission module 215. In other embodiments, the pre-defined permission may be stored in the permission module 215, or other storage devices shown in FIGS. 1, 14, and 15.

In various embodiments, the device registration module 220 provides functionality to allow the user 106 to register one or more devices 110 with the authentication system 150. The pairing module 225 may provide functionality to pair one or more user devices 110 with one or more carrying bags by the user 106, which may be done during the registration process. In some examples, the user devices 110 may be paired with the carrying bag using Bluetooth communications protocols. In some embodiments, the registration process may be part of the preliminary authorization process. The permission module 215 provides functionality to allow the user 106 to define the permissions associated with a registered device during (or after) the registration process. During the device registration process, the interface module 230 provides one or more user interface views (displayed on a user device 110) that allow the user to register devices with an application (e.g., the authentication system 150), to pair devices with carrying bags, and to define permissions (and restrictions in some embodiments) to unlock the registered devices once the user and/or carrying bag have been authenticated.

Figures 9A, 9B:
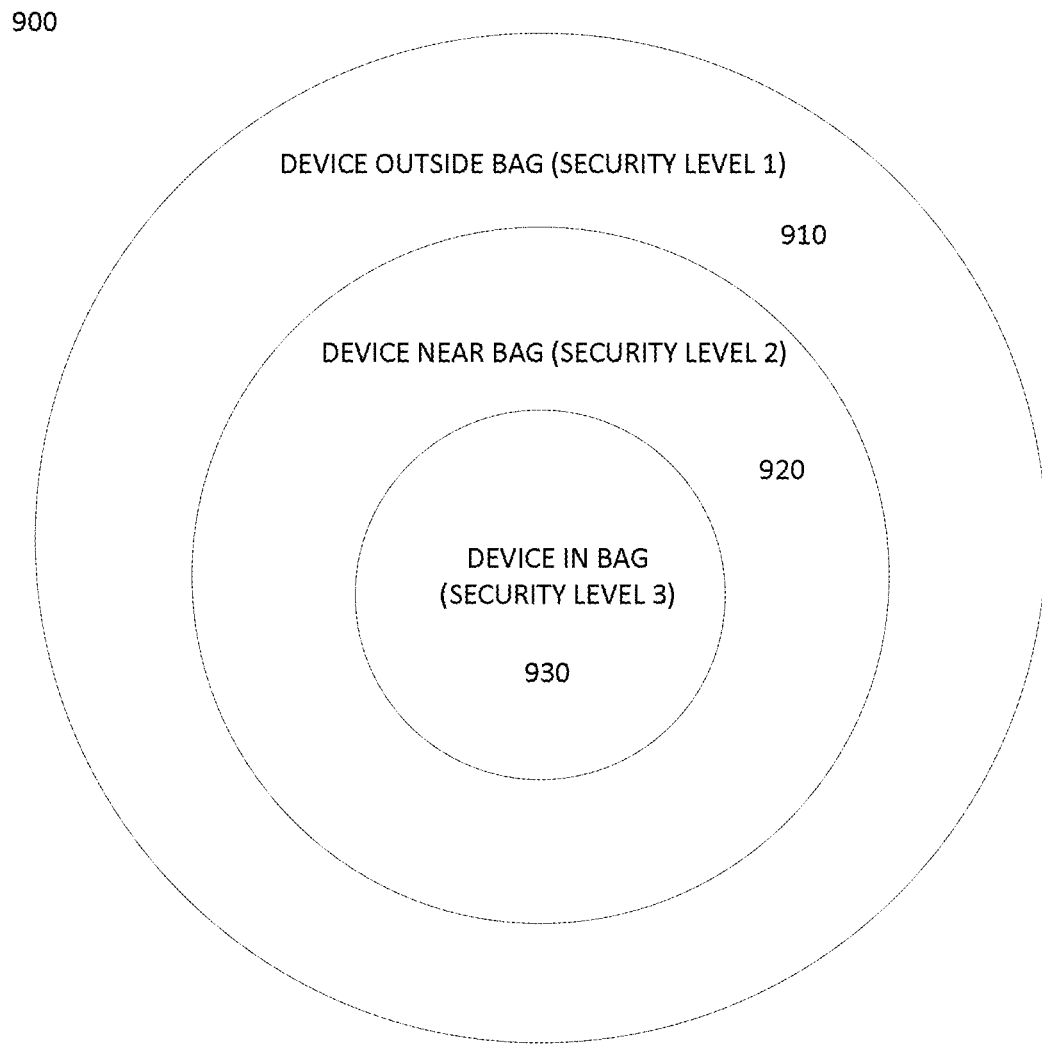
FIGS. 9A and 9B illustrate a diagram and table, respectively, showing different security levels associated with user devices based on the location of user devices inside or outside a carrying bag, according to example embodiments.

Examples of user data received by the interface module 230 include, but are not limited to, registration information used to register one or more user devices, bag information used to associated a carrying bag with one or more user devices, identification information used to specific the types of identification (single or combination) used to authenticate a user or a carrying bag, security information to specify security levels and types of identification for each level of security, unlocking information used to define the permissions for an authenticated user (or carrying bag) to unlock devices and/or unlock one or more apps associated with the devices. The tables shown in FIGS. 7A-7B and FIG. 9B illustrate examples of user data.

FIG. 7D illustrates a pairing table 740 where user devices 1-3 are paired with a carrying bag 1, the user device 1 is paired with the carrying bag 2, and the user devices 1-3 are paired with the carrying bag 3.

The security level module 235 provides functionality to associate various security levels to carrying bags. The security levels reflect various types of information used for authentication. In some embodiments, during the registration process, the registered carrying bags may be associated with a security level. The various security levels may be configured or defined by the user. FIG. 9B illustrates an example of security level information. In the example shown in FIG. 9B, the security level 1 requires a password and fingerprint combination, the security level 2 requires a fingerprint and pattern recognition combination, and the security level 3 requires a fingerprint as the form of identification used for authorization. In other embodiments, various other types of authentication information or combinations or authentication information may be used. In this example, the security level 1 may provide the highest level of security and the security level 3 provide the low level of security. In the example shown in FIG. 9A, the diagram 900 shows the highest level of security (i.e., security level 1) assigned to devices furthest away from the carrying bag; the middle level of security (i.e., security level 2) assigned to devices outside the carrying bag but within a near communication range (e.g., near field communication (NFC) or Bluetooth low energy (BLE); and the devices in the carrying bag require the lowest level of security (i.e., security level 3).

Referring to FIG. 2B, the biometric reader module 240 and the pattern reader module 245 represent sensors or readers for detecting fingerprints and patterns, respectively. The input modules 250 may receive various input types (e.g., 2020 shown in FIG. 2C) for the detection system 145 during the detection process. For example, input types include alphanumeric, point based, tactile, audio, and optical input. The biometric reader module 240 and the pattern reader module 245 may receive input or detect input from a user for authentication.

The detection system 145 may provide functionality to use various types of detection (e.g., detection types 2090 shown in FIG. 2C) for user identification (e.g., identification of biometric info shown in FIG. 2C). The detection system 145 may receive various input types (e.g., input types 2020 shown in FIG. 2C). The user information detected by the detection system 145 is sent to the authentication system 150 as user identification information to authenticate the user and/or carrying bag, and then to authorize the unlocking of one or more devices paired with the authenticated carrying bag.

The communications module 255 provides functionality for the detection system 145 to communicate with the authentication system 150 via communication types 2080 (shown in FIG. 2C) in various embodiments. In some embodiments, the communications module 255 may be able to communicate with other devices, such as user devices 110. For example, the communications module 255 may be used to detect the locations of the user devices 110 with respect to the carrying bag, or for pairing the user devices 110 with the carrying bag.

Figure 3:
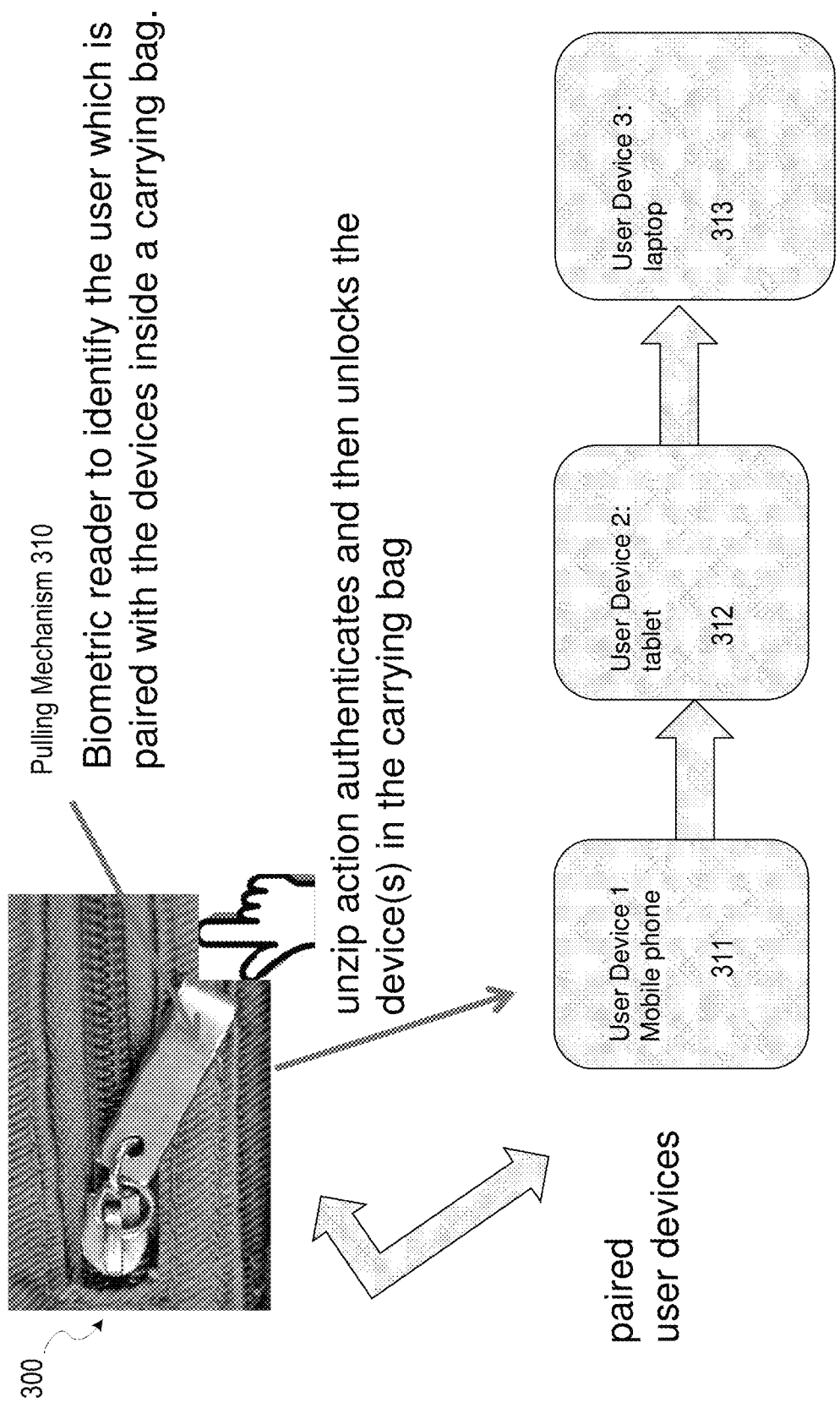
FIG. 3 illustrates an example of a pull mechanism on a sliding fastening device of a carrying bag paired with multiple user devices, according to one embodiment.

FIG. 3 illustrates an example of a pull mechanism 310 in a sliding fastening device (e.g., a zipper) of a carrying bag. In one embodiment, the pull mechanism 310 includes a single biometric reader accessible from one of the surfaces of the pull mechanism. For example, the single biometric reader may be configured to read a user's fingerprint of the user's thumb or index finger. In alternative embodiments, the pull mechanism 310 may include a double biometric reader accessible from two surfaces of the pull mechanism. In this example, the biometric reader may be configured to read a user's fingerprint of the user's thumb in combination with the user's index finger. In other words, two fingerprints are detected by the biometric reader as user identification information used for authentication.

The carrying bag may represent any type of bag or case that includes a sliding fastening device. One or more user devices may be carried in the carrying bag in various embodiments. The user devices may be stored within a zippered compartment or other compartment within the carrying bag. In other embodiments, the user devices may be located outside the carrying bag, either within a near range communications area or beyond the near range communications area. Examples of near range communications areas include NFC or BLE communications ranges. Examples of carrying bags include laptop bags, handbags, backpacks, gym bags, travel bags, briefcases, luggage or suit cases, garment bags, fanny packs, and the like. In some embodiments, the carrying case may include a coat or jacket with a zipper (or zipper-like) pocket. The diagram 300 shown in FIG. 3 illustrates a pull mechanism 310, which includes a biometric reader (not shown), that is paired with three user devices: a user device 1 (a mobile phone 311), a user device 2 (a tablet 312); and a user device 3 (a laptop 313). The user devices 311-313 have been paired (during the preliminary authorization process) with the carrying bag having the pull mechanisms 310.

FIGS. 4A-4C illustrate a carrying bag 410 having a sliding fastening device 415 (e.g., zipper) with a pull mechanism 430 and a stop mechanism 435. The pull mechanism 430 shown in FIG. 4A is a black leather hoop. In an example, a stop mechanism may be shown by the metal ring and used to indicate an end position of the pull mechanism 430. In various embodiments, a stop mechanism 435 may not be used. In other embodiments, the sliding fastening device 415 may include two pull mechanisms 430 that can meet somewhere between a start position 420 and an end position 425. In this example, a middle end point may be represented by where the two pull mechanisms 430 meet.

FIG. 4B illustrates the pull mechanism 430 at the end position 425. FIG. 4C illustrates a user device 110 stored in a front pocket 411 of the carrying bag 410. When the user of the carrying bag 410 contacts the pull mechanism 430 for a predetermined period of time, the biometric reader detects one or two fingerprints, depending on whether the biometric reader is a single reader or a double reader. The detected fingerprint information is sent to the authenticated system 150 as user identification information to verify the validity of the user 106. In some embodiments, the authentication system 150 authenticates the user 106 (who provided the fingerprints). The authentication of the user 106 may also provide authentication of the carrying bag 410, and be referred to as the user's carrying bag 410.

Once the user 106 is authenticated by the user verification module 210, the permission module 215 is able to access the pre-defined permissions related to the user devices 110 to determine the user devices paired with the user's carrying bag 410. In some embodiments, the authentication and authorization processes used to unlock one or more user devices by the authentication system 150 are performed while the pull mechanism 430 is moved from the start position 420 to the end position 425. Once the pull mechanism 430 reaches the end position 425, the authentication and authorization processes are completed, and the paired user devices are unlocked in various embodiments. The pull mechanism 430 may come into contact with the stop mechanism 435 at the end position 425, and in some embodiments, send a stop signal to the authentication system 150. In some embodiments, once the stop signal is received, the user devices authorized to be unlocked are unlocked. This may also include unlocking the user device 110, as well as unlocking one or more apps on the devices (without additional login information). The automatic unlocking of user devices 110 by opening a sliding fastening device 415 with a pull mechanism 430 does not require additional steps by the user 106 to unlock the devices, other than registering user devices and settings permissions during the preliminary authentication process.

FIGS. 5A-5C illustrate another example of a carrying bag 500 having a starting point 510 and an ending point 520. The travel path 515 for the pull mechanism 501 to travel from the starting point 510 to the ending point 520 wraps from one side of the carrying bag 500 to the other side of the carrying bag. FIG. 5C illustrates the starting point with the pull mechanism 501 at the ending point 520. FIG. 5B illustrates the end position of the pull mechanism 501 at the ending point 520. As mentioned above, in some embodiments, the timeframe that the authentication system 150 uses to authenticate a user (and carrying bag), authorize unlocking permissions, and then unlock authorized user devices 110 starts when the user 106 contacts the pull device 501 (after a predetermined period of time) and continues while the user 106 is moving the pull device 501 from the starting point 510 to the ending point 520. Once the pull mechanism 501 is at its end position at the ending point 520, the user devices 110 are unlocked in various embodiments.

Figure 6:
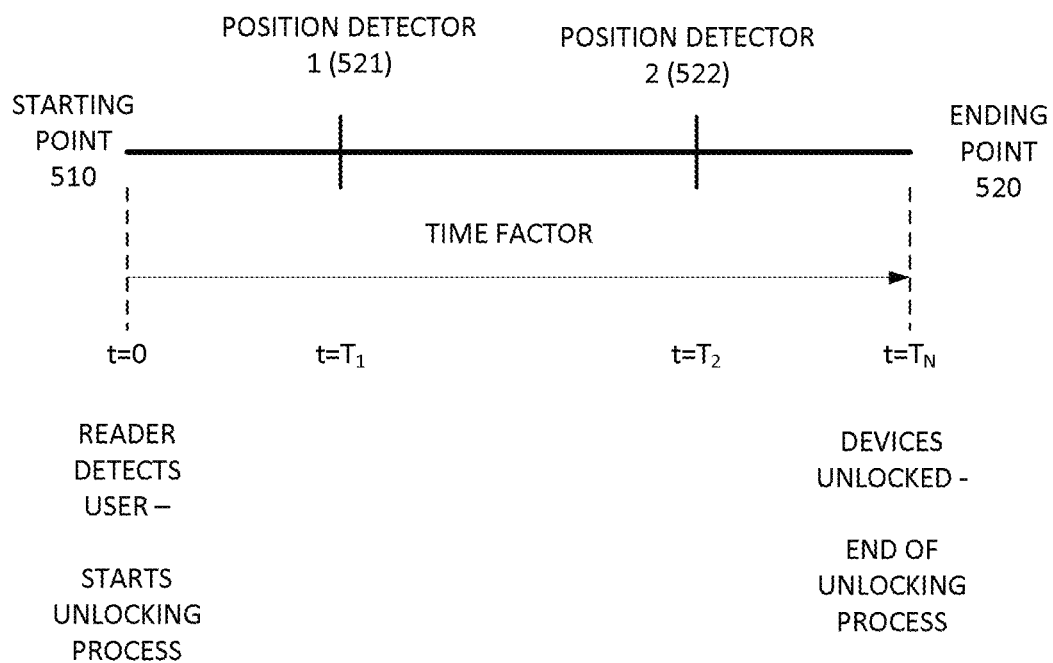
FIG. 6 illustrates a time factor from the starting point to the ending point of a sliding fastening device, according to an example embodiment.

FIG. 6 illustrates that while the pull mechanism 501 is moving along the travel path 515 from the starting point 510 to the ending point 520, one or more position detectors 521 and 522 may detect the location of the pull mechanism 501 along the travel path 515. As shown in FIG. 6, at t=0, the reader detects the user 106 and once the user identification information is sent to the authentication system 150, the authentication system 150 starts the unlocking process. At t=T1, the position detector 521 sends a signal to the authentication system 150 as to the position of the pull mechanism 501 along the travel path 515. At t=T2, the position detector 522 sends a signal to the authentication system 150 as to the position of the pull mechanism 501 along the travel path 515. Once the pull mechanism 501 reaches the ending point 520, the unlocking process has ended and all the authorized devices should be unlocked in example embodiments. In some embodiments, the user may configure that time for unlocking unauthorized devices to correspond to a time factor corresponding to the time it takes the user to pull the pull mechanism 501 along the travel path 515.

Figure 8:
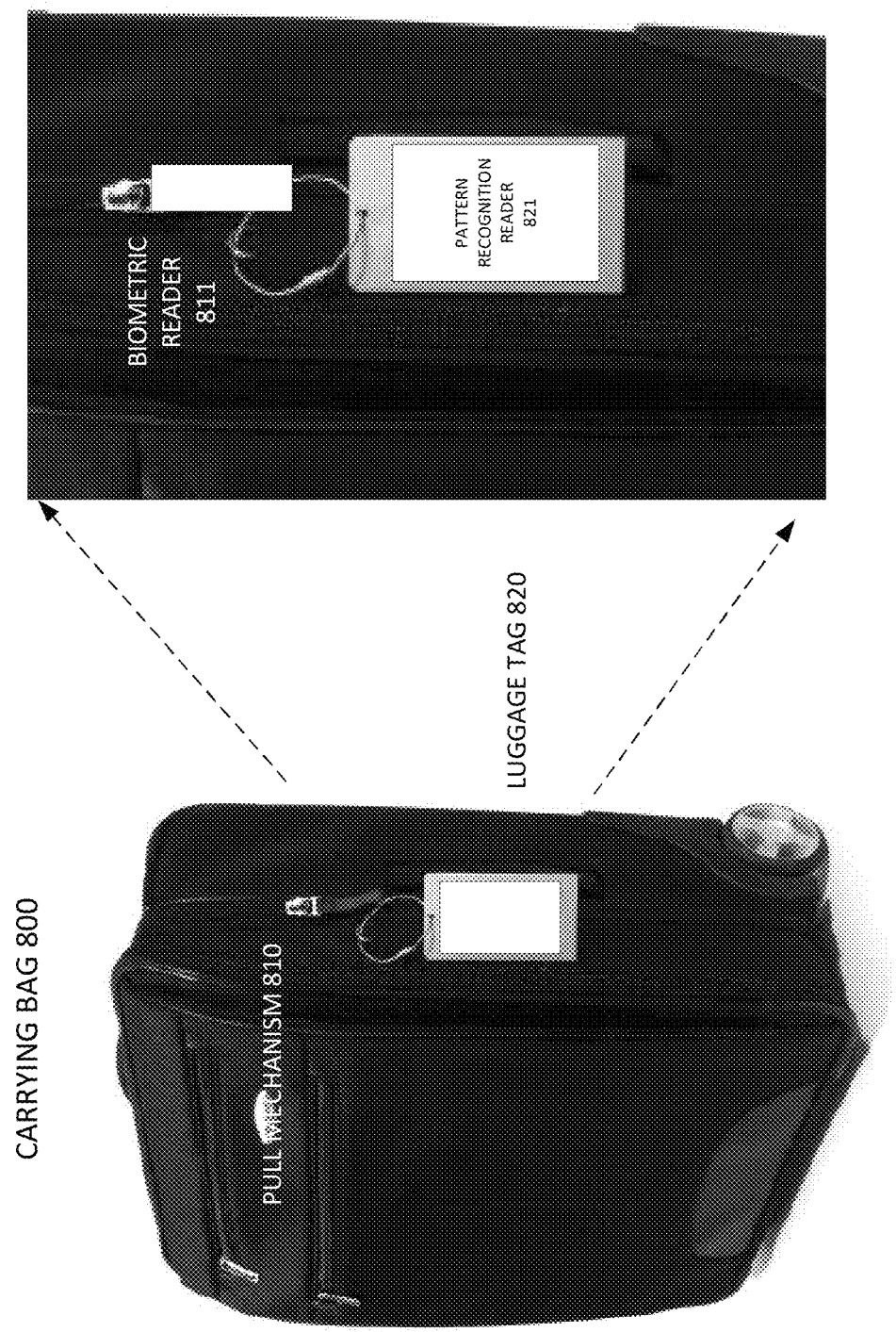
FIG. 8 illustrates a carrying bag, representing luggage, having the pull mechanism of a sliding fastening device and a luggage tag operating as detectors of identification information, according to example embodiments.

FIG. 8 illustrates a carrying bag 800 representing a suitcase. The carrying bag 800 includes a pull mechanism 801 and a luggage tag 820. Both the pull mechanism 810 and the luggage tag 820 include detectors. The pull mechanism 810 includes a biometric reader 811, and the luggage tag 820 includes a pattern recognition reader 821. In various embodiments, the biometric reader 811 detects fingerprints of the user 106. The biometric reader 811 may be a single side or double side biometric reader in various embodiments. In various embodiments, the pattern recognition reader 821 detects patterns. During the preliminary authorization process of defining user settings, the user's fingerprint information is stored and the user's pattern is stored in one or more records associated with the user. In some embodiments, the user may define permission for unlocking the user devices 110 stored within the carrying bag 800 by the combination of the biometric information (fingerprints) and user specified pattern. Both types of identification are to be received by the authentication system 150 prior to authentication the user 106.

FIG. 9A illustrates an example diagram of device locations having previously assigned security levels. In various embodiments, the user devices 110 unlocked by opening a sliding fasting device (e.g., unzipping a zipper) may be stored within the carrying bag or outside the carrying bag. If a user device 110 is stored outside the carrying bag, different security levels may be defined and then assigned to user devices within a certain predefined range versus devices outside the predefined range. The user devices 110 outside the carrying bag but within the predefined range may be represented by circle 920 having an assigned security level 2. The user devices 110 outside the carrying bag but outside the predefined range may be represented by circle 910 having an assigned security level 1. In some examples, the predefined range may include the BLE communications range of approximately 100 meters or NFC range of approximately 10 centimeters.

A user may determine she would like a higher level of security when devices are outside a specified communications range versus devices which are inside her carrying bag (e.g., purse). FIG. 9B illustrates an example of security levels shown in table 920 defined by a user 106. For the highest security level 1, the user 106 requires a combination of user identification information in the form of a password and fingerprint. For the second highest security level 2, the user 106 requires combination of user identification information in the form of a fingerprint and pattern. For the lowest security level 3, the user 106 requires a single user identification information in the form of a fingerprint.

In an example embodiment, the collection of user identification information may be a two or multiple stage process where devices are unlocked at different times. For example, assume that a user reaches her office at work. Insider her purse is her mobile phone. When she unzips her purse, her mobile phone (associated with a security level 3) unlocks. In an example, her desktop computer may be a BLE enabled device (e.g., a beacon device) or in close proximity to a BLE device, and the authentication system 150 may be able to detect that it is a registered user device within the circle 920 having an assigned security level 2. In one example, the security level 2 requires a combination of a fingerprint and a pattern from the user to authenticate the user and the user's carrying bag. In this example, the user's mobile phone includes a pattern recognition reader and receives a pattern information input from the user. Once the user identification information in the form of a pattern is sent to the authentication system 150, and the authentication and authorization process is completed, her desktop computer in her office (which is considered a near device) is unlocked. In other examples, when a combination of user identification information is needed, the mobile device (already unlocked) may be used to enter a simple password to unlock other user devices, such as those in circle 910 requiring a security level 1.

Figure 10:
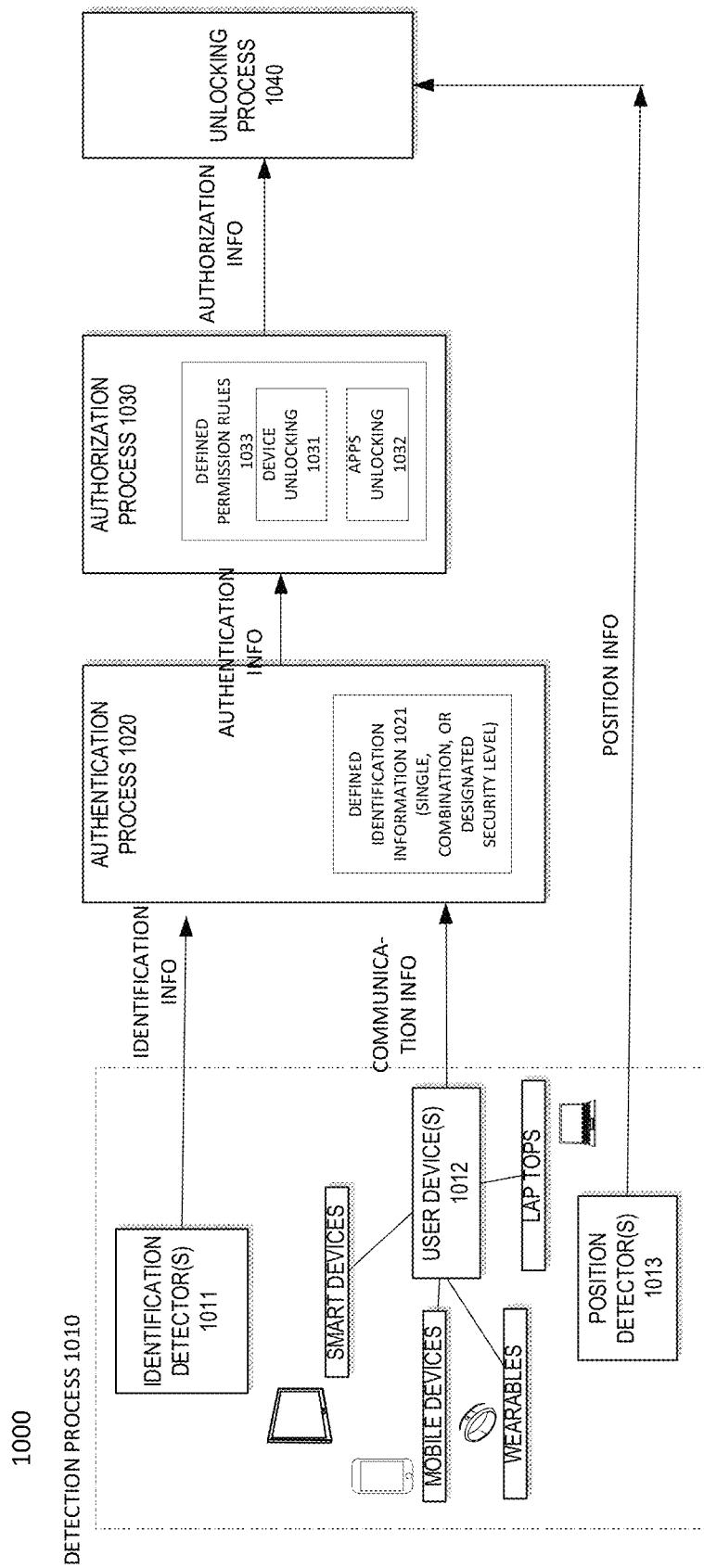
FIG. 10 illustrates a block diagram of various processes used to authenticate users and unlock registered user devices associated with a carrying bag, according to an example embodiment.

FIG. 10 illustrates a block diagram illustrating the flow of information used to unlock user devices associated with a carrying bag. The block diagram 1000 illustrates a detection process 1010, an authentication process 1020, an authorization process 1030, and an unlocking process 1040. The detection process 1010 includes identification detector(s) 1011, user device(s) 1012 and position detector(s) 1013. The identification detectors 1011 send detected user identification information to the authentication process 1020 to authenticate the user and the user's carrying bag. The authentication may use a single type of identification information, a combination of types of identification information, or user identification information specified by an assigned or user designated security level. The user devices 1012 may provide communication information related to the location of the user devices (e.g., if the devices are located within the carrying bag or outside the carrying bag, or how far outside the carrying bag). The authentication process 1021 may use the communication information to determine if a certain level of security applies to a user device. The position detector 1013 provides position information to the authentication process 1020 and the authorization process 1030 related to the position of the pull device along the travel path. In some embodiments, unlocking of the user devices is configured to be completed before the pull device reaches the end of the travel path Authenticated user information is provided to the authorization process 1030. The authorization process authorizes one or more user devices to unlock based on pre-defined permission rules 1033. The permission rules 1033 may authorize one or more user devices to unlock devices or unlock one or more apps when the user devices are unlocked. The permissions rules 1033 may be defined for each user device paired (or associated) with one or more carrying bags. The set of permission rules 1033 for the users 106 may be stored in the authorization table 720 shown in FIG. 7B. The set of permission are pre-defined by the user 106. In one embodiment, the permission data for the set of permissions are accessed for an authorized user to determine which user devices to unlock. The authorization data is sent to the unlocking process 1040. The authorization data is received by the authorized user devices and used to unlock the authorized user devices by the unlocking process 1040.

Figure 11:
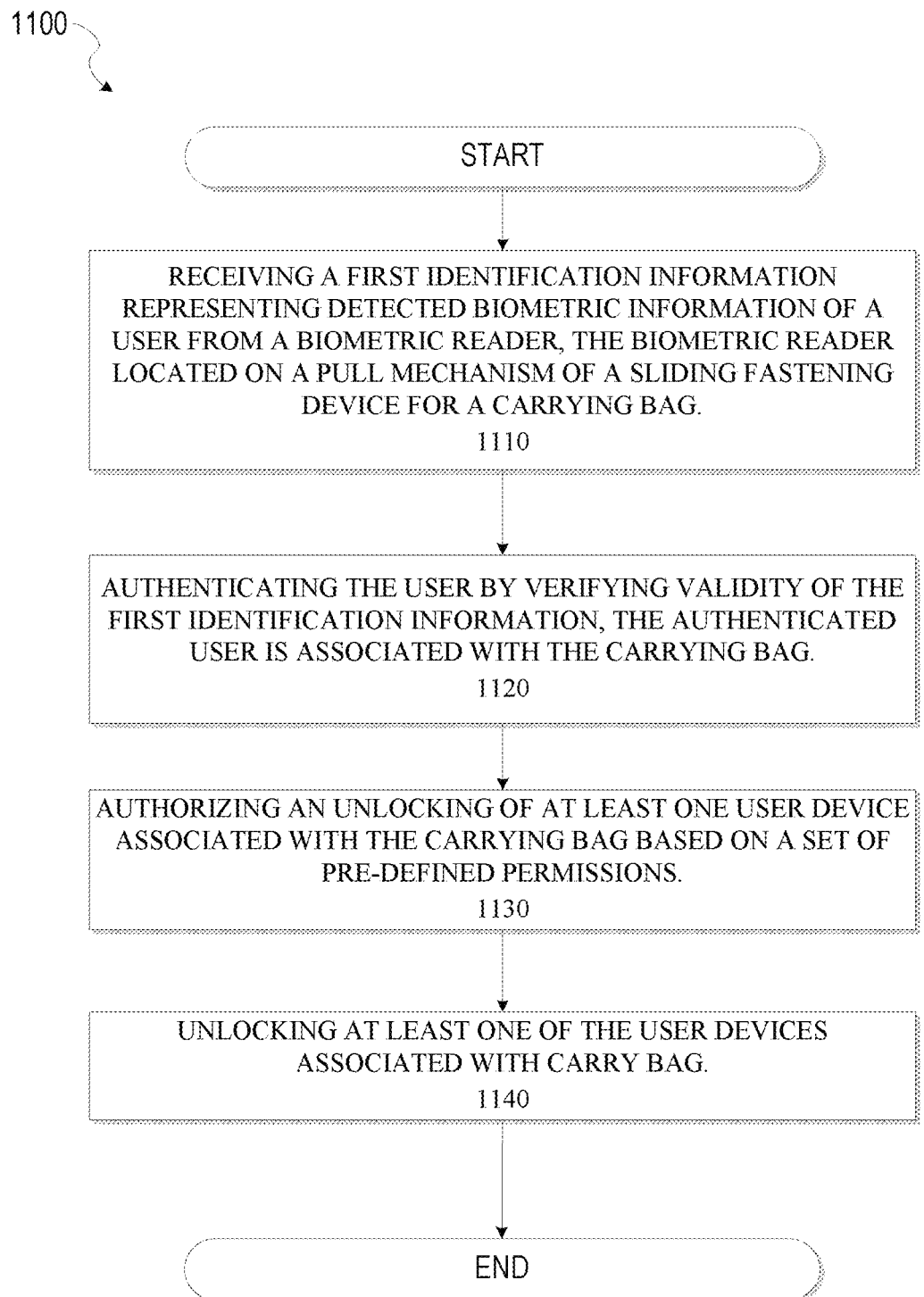
FIG. 11 illustrates a flow diagram of a method to unlock user devices based on biometric information, according to an example embodiment.
Figure 12:
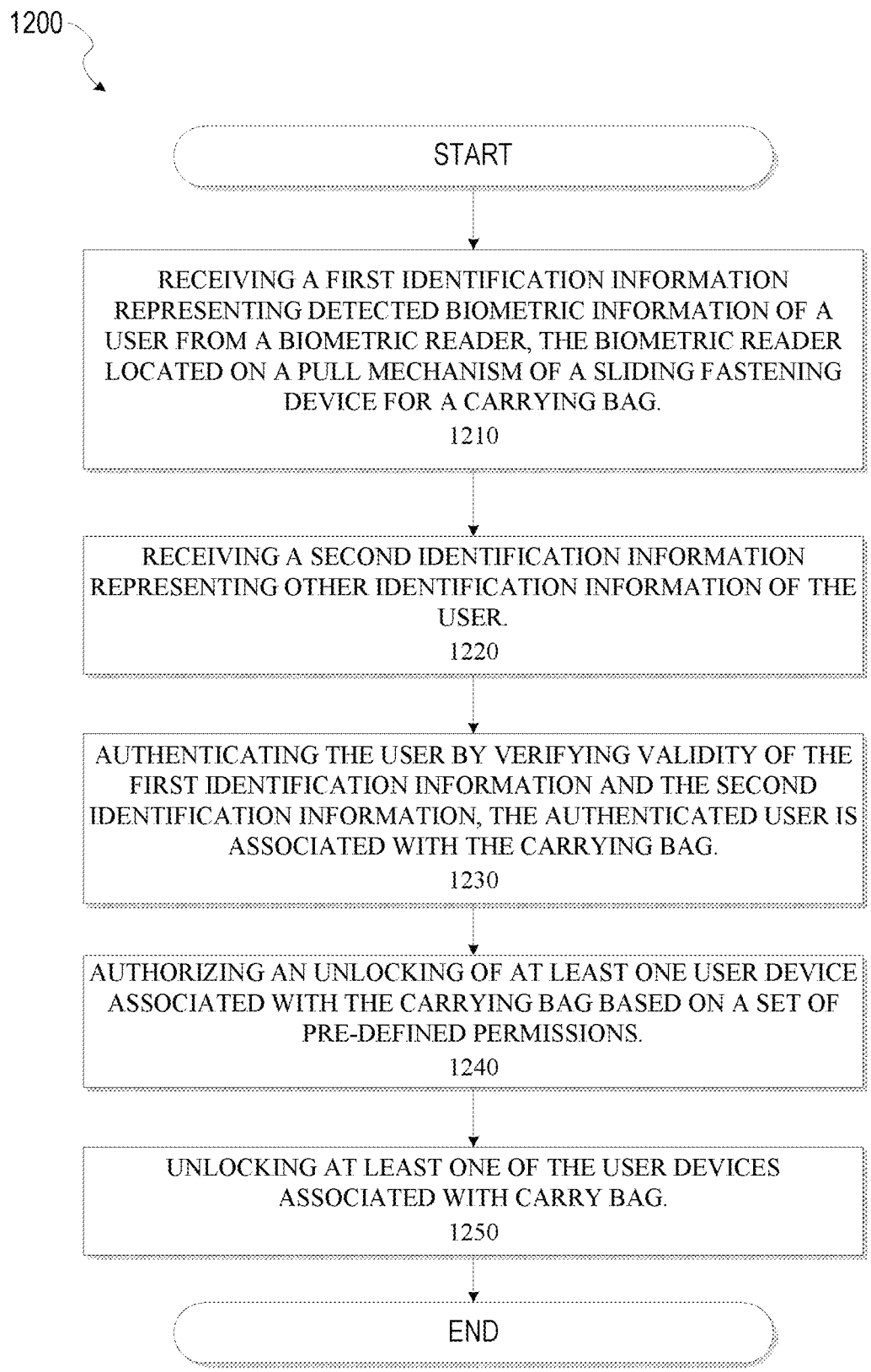
FIG. 12 illustrates a flow diagram of a method to unlock user devices based on a combination of identification information, according to another example embodiment.

FIGS. 11 and 12 illustrate flow diagrams for various embodiments. In various embodiments, additional operations may be added to each of the flow diagrams 1100-1200, or one or more operations may be deleted from each of the flow diagrams 1100-1200. In further embodiments, the operation flow diagrams 1100-1200, or variants of these flow diagrams, may be combined. The operations performed in the flow diagrams 1100-1200, may be performed by one or more components or modules within the authentication system 150.

FIG. 11 is a flow diagram illustrating an example method for unlocking user devices by opening a sliding fastening device of a carrying bag with a pull mechanism, according to an example embodiment. The flow diagram 1100 includes operations 1110-1140.

For an example embodiment, the flow diagram 1100 includes: at operation 1110, receiving a first user identification information representing detected biometric information of a user 106 from a biometric reader, with the biometric reader located on a pull mechanism of a sliding fastening device for a carrying bag; at operation 1120, authenticating the user 106 by verifying the validity of the first identification information, with the authenticated user being associated with the carrying bag; at operation 1130, authorizing an unlocking of at least one user device associated with the carrying bag based on a set of pre-defined permissions; at operation 1140, unlocking at least one of the user devices associated with the carrying bag.

In other embodiments, authenticating the user 106 includes verifying, against existing login records, that the first user identification information is valid. In other embodiments, authorizing the unlocking of at least one user device includes authorizing the authenticated user to simultaneously unlock multiple user devices associated with the carrying bag. In other embodiments, authorizing the unlocking of at least one user device includes authorizing the authenticated user to sequentially unlock multiple user devices associated with the carrying bag. In some embodiments, authorizing the unlocking of at least one user device includes authorizing the authenticated user 106 to unlock one of the user devices associated with the carrying bag and authorizing the authenticated user to bypass additional login requirements for an application of one of the unlocked user devices associated with the carrying bag.

FIG. 12 is a flow diagram illustrating an example method for unlocking user devices by opening a sliding fastening device of a carrying bag with a pull mechanism using a combination of identification information types, according to an example embodiment. The flow diagram 1200 includes operations 1210-1250. For an example embodiment, the flow diagram 1200 includes: at operation 1210, receiving a first user identification information representing detected biometric information of a user 106 from a from a biometric reader, with the biometric reader embedded in a pull mechanism of a sliding fastening device for a carrying bag; at operation 1220, receiving a second user identification information representing other user identification information of the user 106; at operation 1230, authenticating the user 106 by verifying validity of the first user identification information and the second identification information, with the authenticated user 106 being associated with the carrying bag; at operation 1240, authorizing an unlocking of at least one user device associated with the carrying bag based on a set of pre-defined permissions; and at operation 1250, unlocking at least one of the user devices associated with carrying bag.

In an example embodiment, the second user identification information includes detected pattern recognition information. In another embodiment, the second user identification information includes a user password.

In various other embodiments, authenticating the user by verifying validity of the first user identification information includes sending a user authentication request to an authentication service and receiving a response from the authentication service indicating that the user is authenticated. In another embodiment, the authentication services provide single sign-on services.

In additional embodiments, the at least one user device associated with the carrying bag is located within the carrying bag. In other embodiments, the at least one user device associated with the carrying bag is located outside the carrying bag. In a further embodiment, the at least one user device associated with the carrying bag located outside the carrying bag is detectable by a short range communication device.

Referring to FIG. 2C, various input components may provide input to the detection system 145. The input types 2020 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), optical input components, audio input components (e.g., a microphone), and the like. In some implementations, the input types 2020 receive input or detect input from the user to facilitate the functionalities described herein. For instance, the user may interact with a user interface using the input types 2020.

The motion components 2050 include acceleration sensors (e.g., accelerometer), gravitation sensors, rotation sensors (e.g., gyroscope), and so forth. The motion components 2050 may provide motion data such as velocity, acceleration, or other force measurements along an x, y, and z axes. In some implementations, the motion data is provided at a regular update rate or sampling rate (e.g., 10 updates per second) that may be configurable.

The position components 2060 include location sensors (e.g., a GPS receiver component), altitude sensors (e.g., altimeters or barometers that detect air pressure from which altitude may be derived), orientation sensors (e.g., magnetometers that provide magnetic field strength along the x, y, and z axes), and the like. In an example embodiment, the position components 2060 may provide position data such as latitude, longitude, altitude, and a time stamp. Similar to the motion components 2050, the position components 2060 may provide the motion data at a regular update rate that may be configurable.

The biometric components 2070 include components to detect expressions, measure biosignals, or identify people, among other functions. For example, the biometric components 2070 include expression components to detect expressions (also referred to as "kinesics") such as hand gestures (e.g., an optical component to detect a hand gesture or a Doppler component to detect hand motions), vocal expressions (e.g., a microphone to detect changes in voice pitch that may indicate tension), body gestures, facial expressions (e.g., a camera to detect expressions or micro-expressions of a person such as a smile), and eye tracking (e.g., detecting the focal point of a person's eyes or patterns in eye movement). The biometric components 2070 may also include, for example, biosignal components to measure biosignals such as blood pressure, heart rate, body temperature, perspiration, and brain waves (e.g., as determined by a electroencephalogram). In further examples, the biometric components 2070 include identification components to identify people such as retinal scanners (e.g., a camera component), vocal detectors (e.g., a microphone to receive audio data for voice identification), facial detectors, fingerprint detectors, and electroencephalogram sensors (e.g., to identify a person via unique brain wave patterns).

Communication may be implemented using a wide variety of technologies. The input components 2000 may include communication components 2080 operable to communicatively couple machines or devices. For example, the communication components 2080 may include a network interface component or other suitable device to interface with a network (e.g., the network 104). In further examples, the communication components 2080 may include wired communication components, wireless communication components, cellular communication components, NFC components, Bluetooth® components (e.g., BLE), Wi-Fi® components, and other communication components to provide communication via other modalities. In addition, a variety of information may be derived using the communication components 2080 such as location via Internet Protocol (IP) geo-location, location via Wi-Fi® signal triangulation, location via detecting a NFC beacon signal that may indicate a particular location, and so forth.

The detection types 2090 provide functionality to detect a variety of identifiers. For example, the detection types 2090 include Radio Frequency Identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF417, Ultra Code, Uniform Commercial Code Reduced Space Symbology (RSS)-2D bar code, and other optical codes), or acoustic detection components (e.g., microphones to identify tagged audio signals). In additional, a variety of information may be derived via various communication components such as location via IP geo-location, location via Wi-Fi® signal triangulation, location via detecting a NFC beacon signal that may indicate a particular location, and so forth.

Certain embodiments are described herein as including logic or a number of components, modules, or mechanisms. Modules may constitute either software modules (e.g., code embodied on a machine-readable medium or in a transmission signal) or hardware modules. In various embodiments, the modules shown in FIGS. 1 and 2A-2B are specially configured to perform the operations described in the specification. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 13:
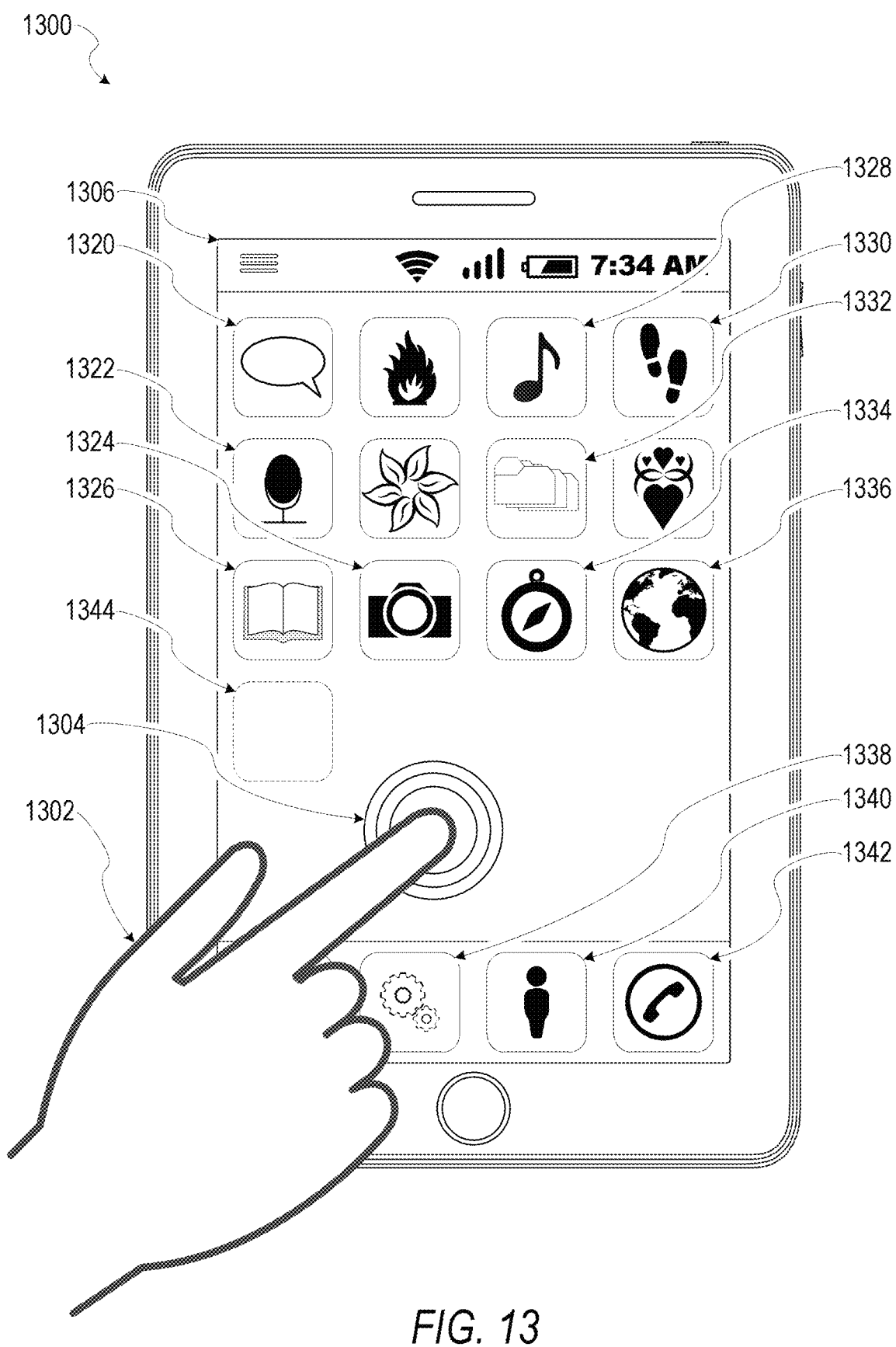
FIG. 13 depicts an example mobile device and mobile operating system interface, according to some example embodiments.

FIG. 13 illustrates an example mobile device 1300 that may be executing a mobile operating system (e.g., iOS™, Android™, Windows® Phone, or other mobile operating systems), according to example embodiments. In one embodiment, the mobile device 1300 may include a touch screen that may receive tactile information from a user 1302. For instance, the user 1302 may physically touch 1304 the mobile device 1300, and in response to the touch 1304, the mobile device 1300 may determine tactile information such as touch location, touch force, gesture motion, and so forth. In various example embodiments, the mobile device 1300 may display a home screen 1306 (e.g., Springboard on iOS™) that the user 1302 of the mobile device 1300 may use to launch applications and otherwise manage the mobile device 1300. In various example embodiments, the home screen 1306 may provide status information such as battery life, connectivity, or other hardware status. The home screen 1306 may also include a plurality of icons that may be activated to launch applications, for example, by touching the area occupied by the icon. Similarly, other user interface elements may be activated by touching an area occupied by a particular user interface element. In this manner, the user 1302 may interact with the applications.

Many varieties of applications (also referred to as "apps") may be executing on the mobile device 1300. The applications may include native applications (e.g., applications programmed in Objective-C, Swift, or another suitable language running on iOS™ or applications programmed in Java running on Android™), mobile web applications (e.g., HTML5), or hybrid applications (e.g., a native shell application that launches an HTML5 session). In a specific example, the mobile device 1300 may include a messaging app 1320, an audio recording app 1322, a camera app 1324, a book reader app 1326, a media app 1328, a fitness app 1330, a file management app 1332, a location app 1334, a browser app 1336, a settings app 1338, a contacts app 1340, a telephone call app 1342, other apps (e.g., gaming apps, social networking apps, biometric monitoring apps), a third party app 1344, and so forth.

Figure 14:
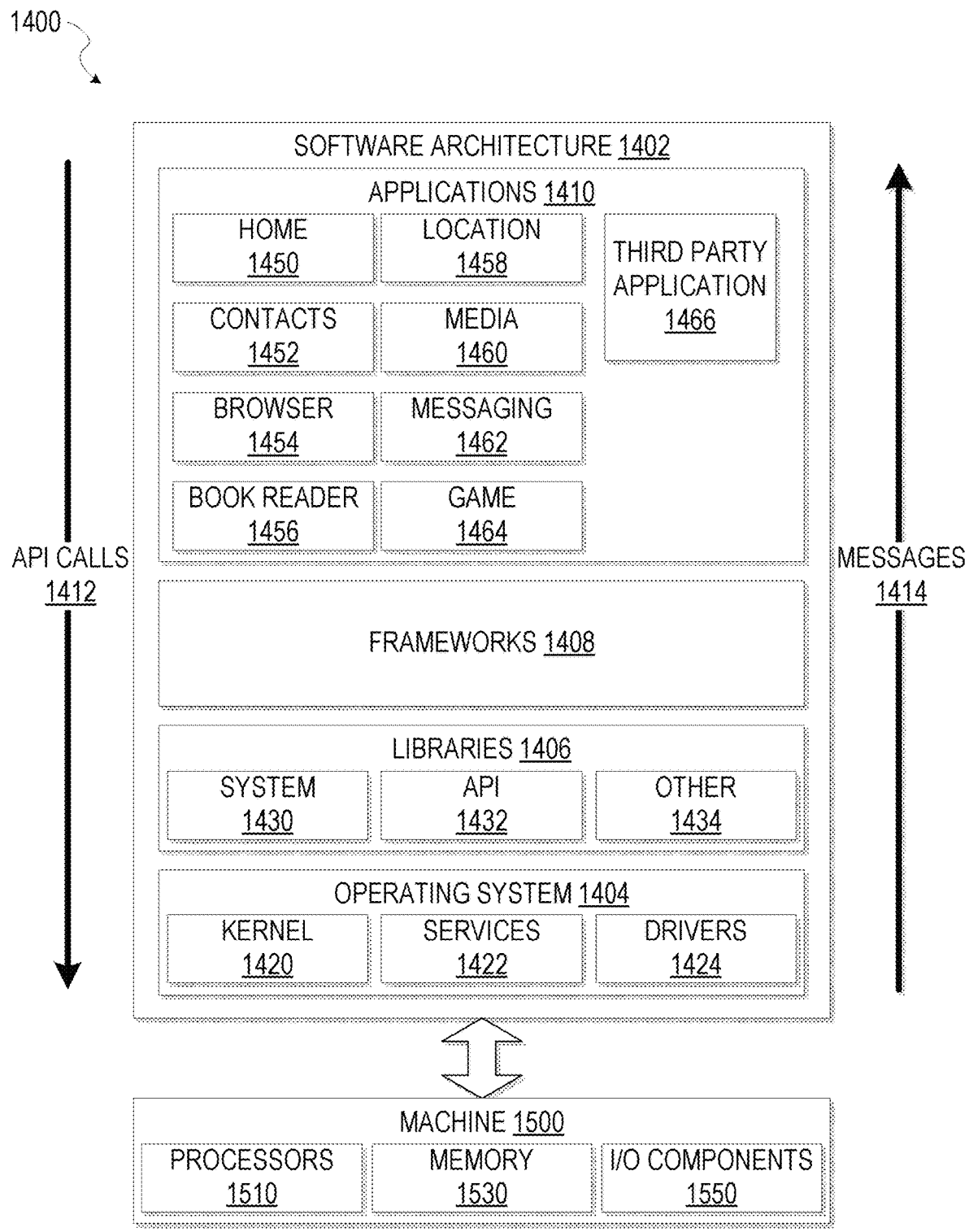
FIG. 14 is a block diagram illustrating an example of a software architecture that may be installed on a machine, according to some example embodiments.

FIG. 14 is a block diagram 1400 illustrating an architecture of software 1402, which may be installed on any one or more of devices described above. FIG. 14 is merely a non-limiting example of a software architecture, and it will be appreciated that many other architectures may be implemented to facilitate the functionality described herein. The software 1402 may be executing on hardware such as machine 1500 of FIG. 15 that includes processors 1510, memory 1530, and input/output (I/O) components 1550. In the example architecture of FIG. 14, the software 1402 may be conceptualized as a stack of layers where each layer may provide particular functionality. For example, the software 1402 may include layers such as an operating system 1404, libraries 1406, frameworks 1408, and applications 1410. Operationally, the applications 1410 may invoke API calls 1412 through the software stack and receive messages 1414 in response to the API calls 1412.

The operating system 1404 may manage hardware resources and provide common services. The operating system 1404 may include, for example, a kernel 1420, services 1422, and drivers 1424. The kernel 1420 may act as an abstraction layer between the hardware and the other software layers. For example, the kernel 1420 may be responsible for memory management, processor management (e.g., scheduling), component management, networking, security settings, and so on. The services 1422 may provide other common services for the other software layers. The drivers 1424 may be responsible for controlling or interfacing with the underlying hardware. For instance, the drivers 1424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1406 may provide a low-level common infrastructure that may be utilized by the applications 1410. The libraries 1406 may include system 1430 libraries (e.g., C standard library) that may provide functions such as memory allocation functions, string manipulation functions, mathematic functions, and the like. In addition, the libraries 1406 may include API libraries 1432 such as media libraries (e.g., libraries to support presentation and manipulation of various media formats such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1406 may also include a wide variety of other libraries 1434 to provide many other APIs to the applications 1410.

The frameworks 1408 may provide a high-level common infrastructure that may be utilized by the applications 1410. For example, the frameworks 1408 may provide various graphic user interface (GUI) functions, high-level resource management, high-level location services, and so forth. The frameworks 1408 may provide a broad spectrum of other APIs that may be utilized by the applications 1410, some of which may be specific to a particular operating system or platform.

The applications 1410 include a home application 1450, a contacts application 1452, a browser application 1454, a book reader application 1456, a location application 1458, a media application 1460, a messaging application 1462, a game application 1464, and a broad assortment of other applications such as third party application 1466. In a specific example, the third party application 1466 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 1466 may invoke the API calls 1412 provided by the mobile operating system 1404 to facilitate functionality described herein.

Figure 15:
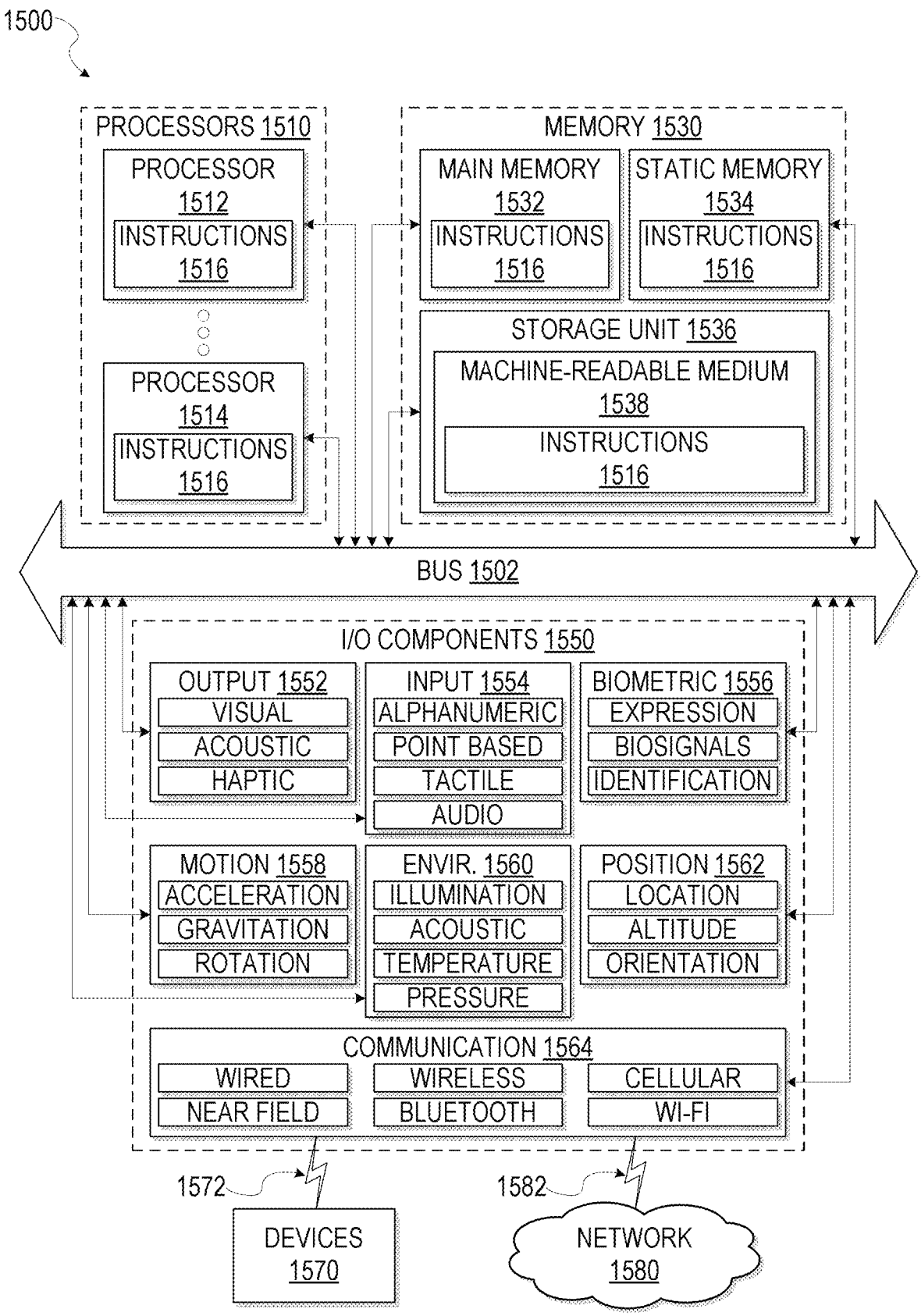
FIG. 15 illustrates a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1512 and processor 1514 that may execute instructions 1516. The term "processor" is intended to include multi-core processors that may comprise two or more independent processors (also referred to as "cores") that may execute instructions contemporaneously. Although FIG. 15 shows multiple processors, the machine 1500 may include a single processor with a single core, a single processor with multiple cores (e.g., a multi-core process), multiple processors with a single core, multiple processors with multiples cores, or any combination thereof.

The memory 1530 may include a main memory 1532, a static memory 1534, and a storage unit 1536 accessible to the processors 1510 via the bus 1502. The storage unit 1536 may include a machine-readable medium 1538 on which are stored the instructions 1516 embodying any one or more of the methodologies or functions described herein. The instructions 1516 may also reside, completely or at least partially, within the main memory 1532, within the static memory 1534, within at least one of the processors 1510 (e.g., within the processor's cache memory), or any suitable combination thereof, during execution thereof by the machine 1500. Accordingly, the main memory 1532, static memory 1534, and the processors 1510 may be considered as machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown in an example embodiment to be a single medium, the term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1550 may include a wide variety of components to receive or detect input, provide output, produce output, transmit information, exchange information, capture measurements, and so on. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1550 may include biometric components 1556, motion components 1558, environmental components 1560, and position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572, respectively. For example, the communication components 1564 may include a network interface component or other suitable device to interface with the network 1580. In further examples, communication components 1564 may include wired communication components, wireless communication components, cellular communication components, NFC components, Bluetooth® components (e.g., BLE), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may RFID tag reader components, NFC smart tag detection components, optical reader components (e.g., an optical sensor to detect one-dimensional bar codes such as UPC bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as, location via IP geo-location, location via Wi-Fi® signal triangulation, location via detecting a NFC beacon signal that may indicate a particular location, and so forth.

In various example embodiments, one or more portions of the network 1580 may be an ad hoc network, an intranet, an extranet, a VPN, a LAN, a WLAN, a WAN, a wireless WAN (WWAN), a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., HyperText Transfer Protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Furthermore, the machine-readable medium 1538 is non-transitory (in other words, not having any transitory signals) in that it does not embody a propagating signal. However, labeling the machine-readable medium 1538 as "non-transitory" should not be construed to mean that the medium is incapable of movement; the medium should be considered as being transportable from one physical location to another. Additionally, since the machine-readable medium 1538 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system for unlocking a plurality of registered devices associated with a carrying bag, the system comprising:
   at least one hardware processor;
   at least one hardware memory storing instructions that when executed configure the at least one hardware processor to perform operations including:
      receiving first identification information associated with a user, the first identification information detected by a reader located on a sliding fastening device of the carrying bag, the first identification information detected when the sliding fastening device of the carrying bag is grasped by the user;
      authenticating the user, based on the first identification information; and
      based on pre-defined permissions associated with the registered devices, causing the plurality of registered devices to unlock in response to the authenticating, the plurality of registered devices paired with the carrying bag.

2. The system of claim 1, the operations further comprising:
   verifying, against existing login records, that the first identification information is valid.

3. The system of claim 1, wherein the causing of the plurality of registered devices to unlock unlocks the plurality of registered devices simultaneously.

4. A method comprising:
   receiving data indicative of first identification information associated with a user, the first identification information detected by a reader located on a sliding fastening device of a carrying bag and grasped by the user when manipulating the sliding fastening device of the carrying bag;
   authenticating the user based on the first identification information; and
   causing a plurality of registered devices to unlock in response to the authenticating, wherein the plurality of registered devices are paired with the carrying bag and the registered devices are unlocked based on pre-defined permissions associated with the registered devices.

5. The method of claim 4, further comprising verifying, against existing login records, that the first identification information is valid.

6. The method of claim 4, wherein causing the plurality of registered devices to unlock simultaneously unlocks the plurality of registered devices.

7. The method of claim 4, wherein authorizing the unlocking of the plurality of registered devices further comprises:
   authorizing sequential unlocking of the plurality of registered devices.

8. The method of claim 4, further comprising:
   authorizing a bypass of additional login requirements of one or more of the plurality of registered devices.

9. The method of claim 4, wherein authenticating the user further comprises:
   sending a user authentication request to an authentication service; and
   receiving a response from the authentication service indicating the user is authenticated.

10. The method of claim 9, wherein the authentication service provides single sign-on services.

11. The method of claim 4, wherein at least one of the plurality of registered devices is located within the carrying bag.

12. The method of claim 4, wherein at least one of the plurality of registered devices is located outside the carrying bag.

13. The method of claim 12, wherein the at least one registered device located outside the carrying bag is detectable by a short-range communication device.

14. A non-transitory machine-readable medium storing instructions that, when executed by at least one processor of a machine, cause the machine to perform operations comprising:
   receiving first identification information associated with a user, the first identification information received by a reader located on a sliding fastening device of a carrying bag and grasped by the user when manipulating the sliding fastening device of the carrying bag;
   authenticating the user based on the first identification information; and
   causing a plurality of devices to unlock in response to the authenticating, wherein the plurality of devices are registered with and paired with the carrying bag, and wherein the devices are unlocked based on predetermined permissions associated with the devices.

15. The system of claim 1, the operations further comprising:
- allowing the user to register and pair the plurality of registered devices with an authentication system that is remote from the carrying bag.

16. The method of claim 4, further comprising:
- registering the user with an authentication system that is remote from the carrying bag; and
- pairing the plurality of devices with the carrying bag using the authentication system.

17. The system of claim 1, wherein the sliding fastening device includes a pull mechanism and also includes a stop mechanism at an end position of the sliding fastening device, wherein the causing of the plurality of registered devices to unlock is in response to the pull mechanism contacting the stop mechanism.

18. The method of claim 4, wherein the sliding fastening device includes a pull mechanism and also includes a stop mechanism at an end position of the sliding fastening device, wherein the causing of the plurality of registered devices to unlock is in response to the pull mechanism contacting the stop mechanism.

19. The system of claim 1, wherein authenticating the user further comprises:
- sending a user authentication request to an authentication service; and
- receiving a response from the authentication service indicating the user is authenticated.

20. The system of claim 19, wherein the authentication service provides single sign-on services.

* * * * *